US012596780B2

(12) United States Patent
Ogbennah et al.

(10) Patent No.: US 12,596,780 B2
(45) Date of Patent: Apr. 7, 2026

(54) TECHNIQUES TO PERFORM DYNAMIC CALL CENTER AUTHENTICATION UTILIZING A CONTACTLESS CARD

(71) Applicant: Capital One Services, LLC, McLean, VA (US)

(72) Inventors: Francis Ogbennah, Baltimore, MD (US); Katherine Mchugh, Richmond, VA (US); Kevin Osborn, Newton Highlands, MA (US)

(73) Assignee: Capital One Services, LLC., McLean, VA (US)

( * ) Notice: Subject to any disclaimer, the term of this patent is extended or adjusted under 35 U.S.C. 154(b) by 526 days.

(21) Appl. No.: 17/850,278

(22) Filed: Jun. 27, 2022

(65) Prior Publication Data

US 2023/0418923 A1     Dec. 28, 2023

(51) Int. Cl.
G06F 21/35 (2013.01)
G06K 19/07 (2006.01)
H04M 3/51 (2006.01)

(52) U.S. Cl.
CPC ......... G06F 21/35 (2013.01); G06K 19/0723 (2013.01); H04M 3/51 (2013.01)

(58) Field of Classification Search
CPC ....... G06F 21/35; G06K 19/0723; H04M 3/51
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |

| | | | |
|---|---|---|---|
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,590,038 A | 12/1996 | Pitroda | |
| 5,592,553 A | 1/1997 | Guski et al. | |
| 5,616,901 A | 4/1997 | Crandall | |
| 5,666,415 A | 9/1997 | Kaufman | |
| 5,763,373 A | 6/1998 | Robinson et al. | |
| 5,764,789 A | 6/1998 | Pare, Jr. et al. | |
| 5,768,373 A | 6/1998 | Lohstroh et al. | |
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Kostas J Katsikis

(74) *Attorney, Agent, or Firm* — KDW FIRM PLLC

(57)     ABSTRACT

Techniques and systems to perform authentication utilizing a mini-application.

17 Claims, 17 Drawing Sheets

(56)         References Cited

U.S. PATENT DOCUMENTS

| | | | |
|---|---|---|---|
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |

(56) References Cited

U.S. PATENT DOCUMENTS

| | | | |
|---|---|---|---|
| 8,594,730 | B2 | 11/2013 | Bona et al. |
| 8,615,468 | B2 | 12/2013 | Varadarajan |
| 8,620,218 | B2 | 12/2013 | Awad |
| 8,667,285 | B2 | 3/2014 | Coulier et al. |
| 8,723,941 | B1 | 5/2014 | Shirbabadi et al. |
| 8,726,405 | B1 | 5/2014 | Bailey et al. |
| 8,740,073 | B2 | 6/2014 | Vijayshankar et al. |
| 8,750,514 | B2 | 6/2014 | Gallo et al. |
| 8,752,189 | B2 | 6/2014 | de Jong |
| 8,794,509 | B2 | 8/2014 | Bishop et al. |
| 8,799,668 | B2 | 8/2014 | Cheng |
| 8,806,592 | B2 | 8/2014 | Ganesan |
| 8,807,440 | B1 | 8/2014 | von Behren et al. |
| 8,811,892 | B2 | 8/2014 | Khan et al. |
| 8,814,039 | B2 | 8/2014 | Bishop et al. |
| 8,814,052 | B2 | 8/2014 | Bona et al. |
| 8,818,867 | B2 | 8/2014 | Baldwin et al. |
| 8,850,538 | B1 | 9/2014 | Vernon et al. |
| 8,861,733 | B2 | 10/2014 | Benteo et al. |
| 8,870,081 | B2 | 10/2014 | Olson |
| 8,880,027 | B1 | 11/2014 | Darringer |
| 8,888,002 | B2 | 11/2014 | Marshall Chesney et al. |
| 8,898,088 | B2 | 11/2014 | Springer et al. |
| 8,934,837 | B2 | 1/2015 | Zhu et al. |
| 8,977,569 | B2 | 3/2015 | Rao |
| 8,994,498 | B2 | 3/2015 | Agrafioti et al. |
| 9,004,365 | B2 | 4/2015 | Bona et al. |
| 9,038,893 | B2 | 5/2015 | Kirkham |
| 9,038,894 | B2 | 5/2015 | Khalid |
| 9,042,814 | B2 | 5/2015 | Royston et al. |
| 9,047,531 | B2 | 6/2015 | Showering et al. |
| 9,069,976 | B2 | 6/2015 | Toole et al. |
| 9,081,948 | B2 | 7/2015 | Magne |
| 9,104,853 | B2 | 8/2015 | Venkataramani et al. |
| 9,118,663 | B1 | 8/2015 | Bailey et al. |
| 9,122,964 | B2 | 9/2015 | Krawczewicz |
| 9,129,199 | B2 | 9/2015 | Spodak |
| 9,129,280 | B2 | 9/2015 | Bona et al. |
| 9,152,832 | B2 | 10/2015 | Royston et al. |
| 9,183,490 | B2 | 11/2015 | Moreton |
| 9,203,800 | B2 | 12/2015 | Izu et al. |
| 9,209,867 | B2 | 12/2015 | Royston |
| 9,251,330 | B2 | 2/2016 | Boivie et al. |
| 9,251,518 | B2 | 2/2016 | Levin et al. |
| 9,258,715 | B2 | 2/2016 | Borghei |
| 9,270,337 | B2 | 2/2016 | Zhu et al. |
| 9,275,325 | B2 | 3/2016 | Newcombe |
| 9,286,606 | B2 | 3/2016 | Diamond |
| 9,306,626 | B2 | 4/2016 | Hall et al. |
| 9,306,753 | B1 | 4/2016 | Vandervort |
| 9,306,942 | B1 | 4/2016 | Bailey et al. |
| 9,324,066 | B2 | 4/2016 | Archer et al. |
| 9,324,067 | B2 | 4/2016 | Van Os et al. |
| 9,332,587 | B2 | 5/2016 | Salahshoor |
| 9,338,622 | B2 | 5/2016 | Bjontegard |
| 9,373,141 | B1 | 6/2016 | Shakkarwar |
| 9,379,841 | B2 | 6/2016 | Fine et al. |
| 9,413,430 | B2 | 8/2016 | Royston et al. |
| 9,413,768 | B1 | 8/2016 | Gregg et al. |
| 9,420,496 | B1 | 8/2016 | Indurkar |
| 9,426,132 | B1 | 8/2016 | Alikhani |
| 9,432,339 | B1 | 8/2016 | Bowness |
| 9,455,968 | B1 | 9/2016 | Machani et al. |
| 9,473,509 | B2 | 10/2016 | Arsanjani et al. |
| 9,491,626 | B2 | 11/2016 | Sharma et al. |
| 9,501,776 | B2 | 11/2016 | Martin |
| 9,553,637 | B2 | 1/2017 | Yang et al. |
| 9,619,952 | B1 | 4/2017 | Zhao et al. |
| 9,635,000 | B1 | 4/2017 | Muftic |
| 9,665,858 | B1 | 5/2017 | Kumar |
| 9,674,705 | B2 | 6/2017 | Rose et al. |
| 9,679,286 | B2 | 6/2017 | Colnot et al. |
| 9,680,942 | B2 | 6/2017 | Dimmick |
| 9,710,744 | B2 | 7/2017 | Wurmfeld |
| 9,710,804 | B2 | 7/2017 | Zhou et al. |
| 9,740,342 | B2 | 8/2017 | Paulsen et al. |
| 9,740,988 | B1 | 8/2017 | Levin et al. |
| 9,763,097 | B2 | 9/2017 | Robinson et al. |
| 9,767,329 | B2 | 9/2017 | Forster |
| 9,769,662 | B1 | 9/2017 | Queru |
| 9,773,151 | B2 | 9/2017 | Mil'shtein et al. |
| 9,780,953 | B2 | 10/2017 | Gaddam et al. |
| 9,891,823 | B2 | 2/2018 | Feng et al. |
| 9,940,571 | B1 | 4/2018 | Herrington |
| 9,949,065 | B1 | 4/2018 | Zarakas |
| 9,953,323 | B2 | 4/2018 | Candelore et al. |
| 9,961,194 | B1 | 5/2018 | Wiechman et al. |
| 9,965,632 | B2 | 5/2018 | Zarakas |
| 9,965,756 | B2 | 5/2018 | Davis et al. |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld et al. |
| 9,990,795 | B2 | 6/2018 | Wurmfeld |
| 10,007,873 | B2 | 6/2018 | Heo |
| 10,013,693 | B2 | 7/2018 | Wyatt |
| 10,043,164 | B2 | 8/2018 | Dogin et al. |
| 10,075,437 | B1 | 9/2018 | Costigan et al. |
| 10,121,130 | B2 | 11/2018 | Pinski |
| 10,129,648 | B1 | 11/2018 | Hernandez et al. |
| 10,133,979 | B1 | 11/2018 | Eidam et al. |
| 10,210,505 | B2 | 2/2019 | Zarakas |
| 10,217,105 | B1 | 2/2019 | Sangi et al. |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,165,586 | B1 * | 11/2021 | Rule .................. G06F 16/9566 |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2001/0010723 | A1 | 8/2001 | Pinkas |

(56)　　　References Cited

U.S. PATENT DOCUMENTS

| | | |
|---|---|---|
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |

(56) References Cited

U.S. PATENT DOCUMENTS

| | | |
|---|---|---|
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Ansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |

(56) References Cited

U.S. PATENT DOCUMENTS

| | | |
|---|---|---|
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0052474 A1 | 2/2019 | Dizengof |
| 2019/0172055 A1 | 6/2019 | Hale |
| 2019/0238517 A1 | 8/2019 | D'Agostino et al. |
| 2019/0303945 A1 | 10/2019 | Mitra |
| 2021/0004806 A1 | 1/2021 | Noe |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0141024 A1 | 5/2022 | Rule |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| KR | 20150140132 A | 12/2015 |
| WO | 9910824 A1 | 3/1999 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

(56) References Cited

OTHER PUBLICATIONS

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD ?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
International Search Report and Written Opinion for the International Application No. PCT/US20233/020533, mailed Jul. 19, 2023, 14 pages.
Author Unknown, "Global expansion of card tapping mobile OTP for security and convenience is imminent," Jun. 28, 2022, website: https://www.swidch.com/blogs/card-tapping-motp-blog.
EMVCo, LLC, "Emv Card Personalisation Specification," Aug. 1, 2021, retrieved from the Internet URL: https://www.emvco.com/specification/?post_id=12467, 114 pages.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.

* cited by examiner

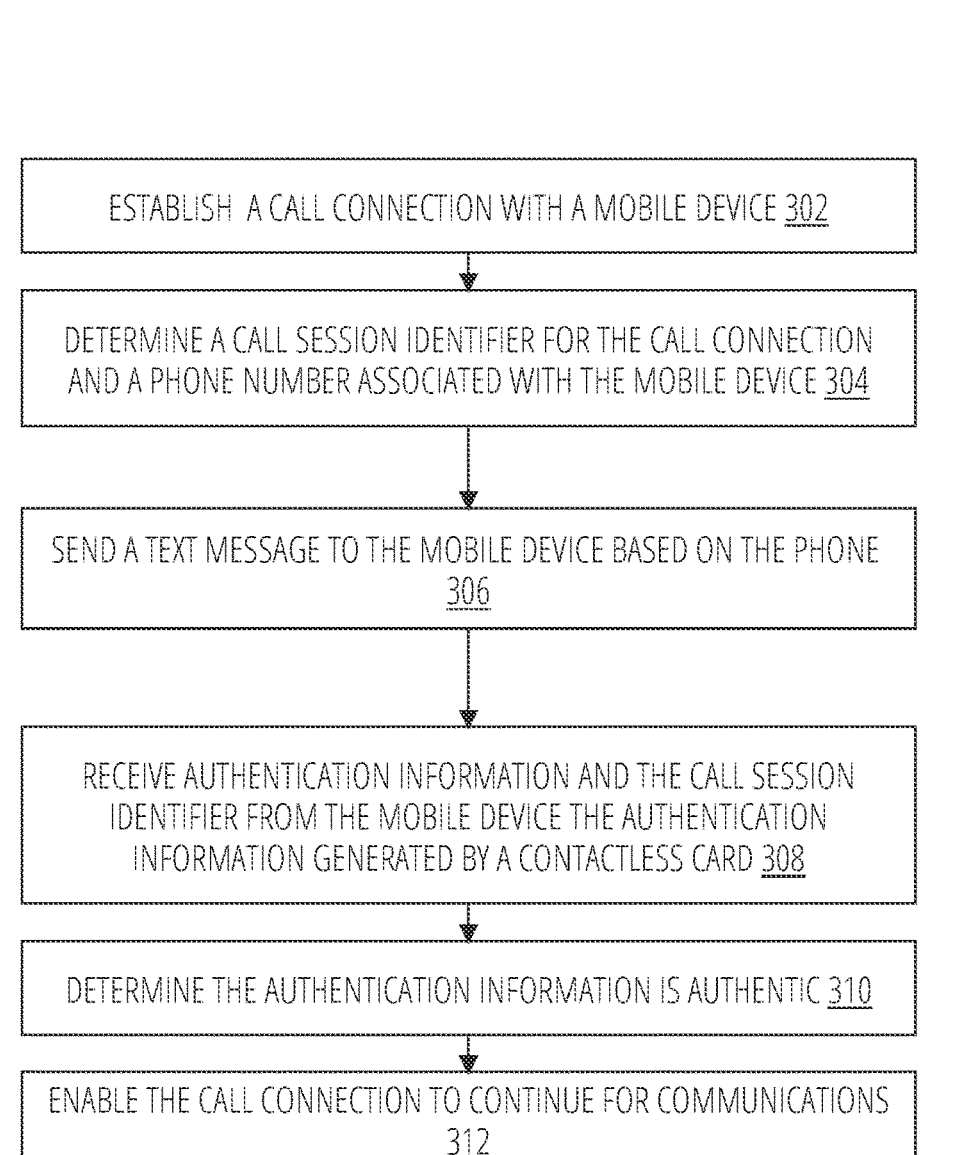

ESTABLISH A CALL CONNECTION WITH A MOBILE DEVICE 302

DETERMINE A CALL SESSION IDENTIFIER FOR THE CALL CONNECTION AND A PHONE NUMBER ASSOCIATED WITH THE MOBILE DEVICE 304

SEND A TEXT MESSAGE TO THE MOBILE DEVICE BASED ON THE PHONE 306

RECEIVE AUTHENTICATION INFORMATION AND THE CALL SESSION IDENTIFIER FROM THE MOBILE DEVICE THE AUTHENTICATION INFORMATION GENERATED BY A CONTACTLESS CARD 308

DETERMINE THE AUTHENTICATION INFORMATION IS AUTHENTIC 310

ENABLE THE CALL CONNECTION TO CONTINUE FOR COMMUNICATIONS 312

FIG. 3

400

ESTABLISH A CALL CONNECTION WITH A CALL CENTER SYSTEM 402

RECEIVE A TEXT MESSAGE COMPRISING A CALL SESSION IDENTIFIER AND A MINI APPLICATION LINK, THE MINI APPLICATION LINK CONFIGURED TO RETRIEVE A CODE SNIPPET FROM A SERVER 404

RECEIVE THE CODE SNIPPET FROM THE SERVER 406

EXECUTE THE CODE SNIPPET, THE CODE SNIPPET CAUSING A PROMPT TO PRESENT ON A DISPLAY OF THE MOBILE DEVICE TO TAP A CONTACTLESS CARD ON OR NEAR THE MOBILE DEVICE 408

RECEIVE AUTHENTICATION INFORMATION FROM THE CONTACTLESS CARD BASED ON THE TAP OF THE CONTACTLESS CARD ON OR NEAR THE MOBILE DEVICE 410

SEND THE AUTHENTICATION INFORMATION AND THE CALL SESSION IDENTIFIER 412

MAINTAIN THE CALL CONNECTION WITH THE CALL CENTER SYSTEM BASED ON AN INDICATION THE AUTHENTICATION INFORMATION IS AUTHENTICATED 414

FIG. 4

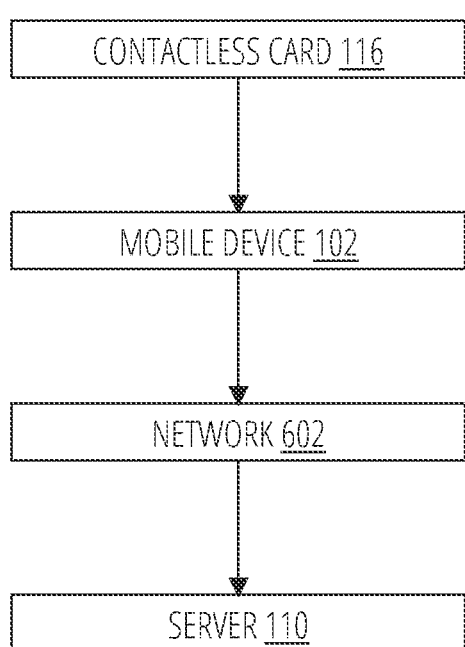
FIG. 6

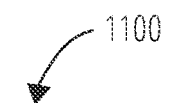
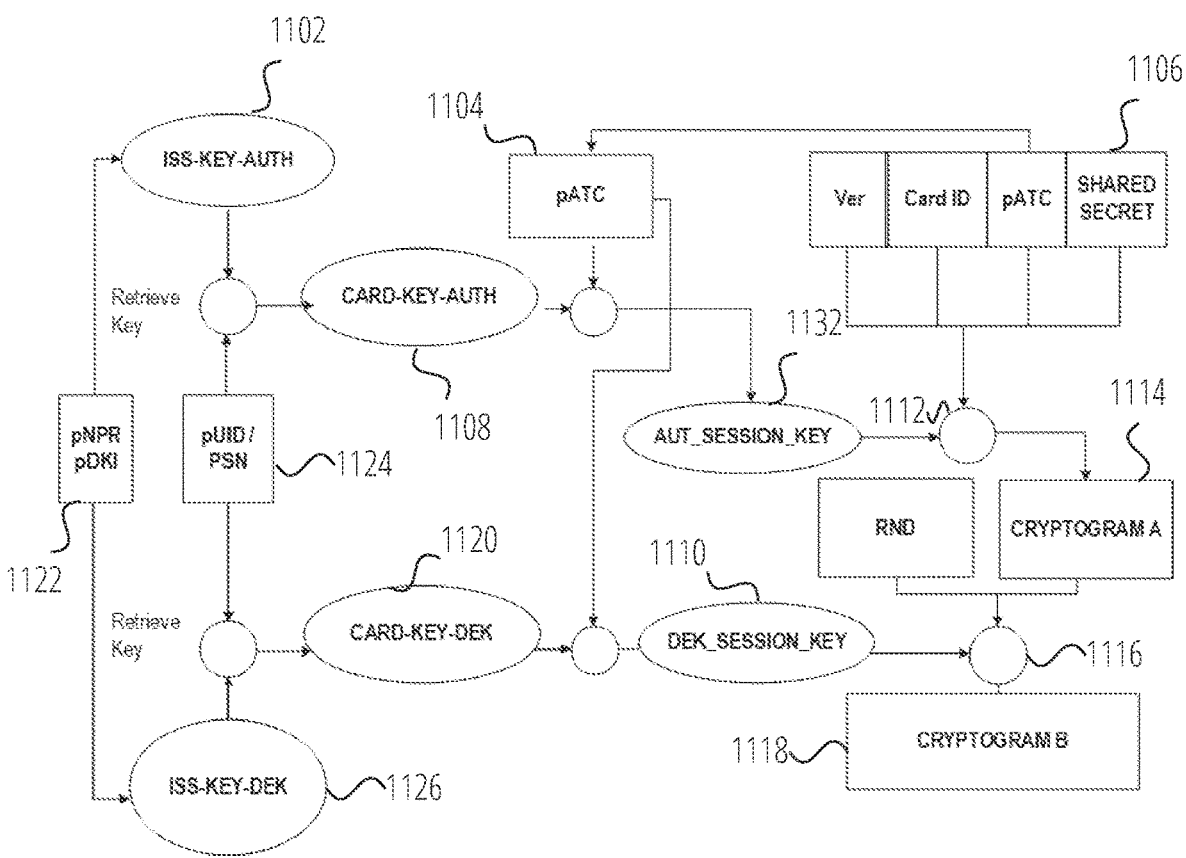
FIG. 11

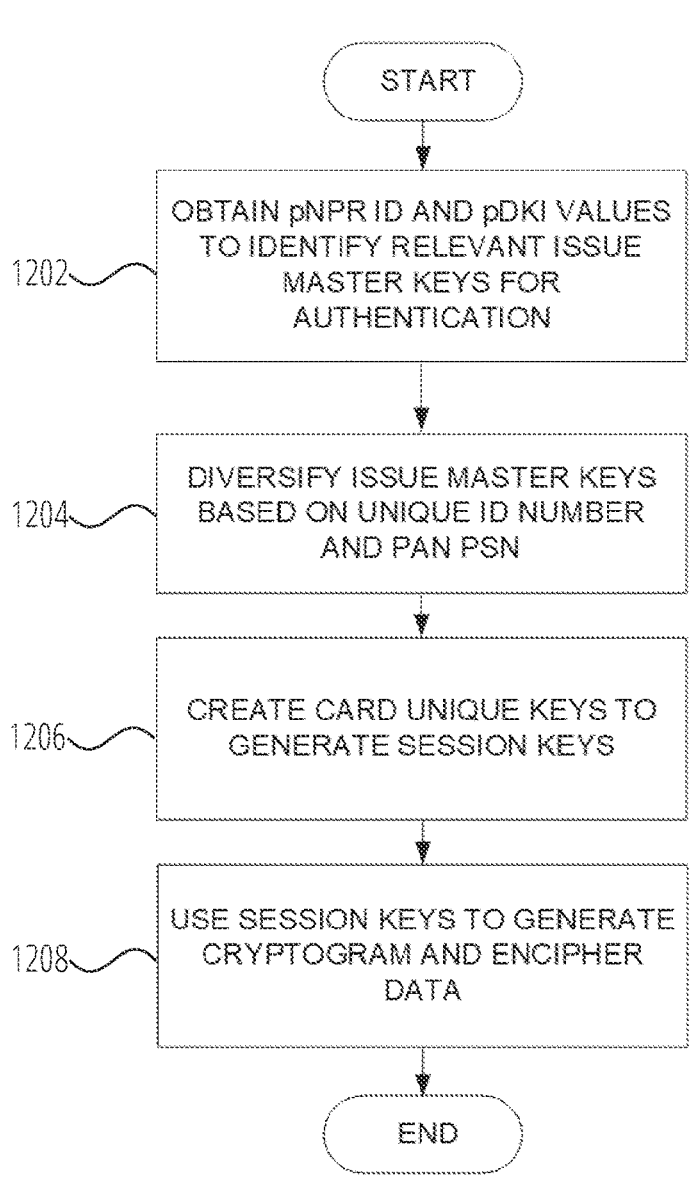
START
1202 — OBTAIN pNPR ID AND pDKI VALUES TO IDENTIFY RELEVANT ISSUE MASTER KEYS FOR AUTHENTICATION
1204 — DIVERSIFY ISSUE MASTER KEYS BASED ON UNIQUE ID NUMBER AND PAN PSN
1206 — CREATE CARD UNIQUE KEYS TO GENERATE SESSION KEYS
1208 — USE SESSION KEYS TO GENERATE CRYPTOGRAM AND ENCIPHER DATA
END
FIG. 12

TECHNIQUES TO PERFORM DYNAMIC CALL CENTER AUTHENTICATION UTILIZING A CONTACTLESS CARD

BACKGROUND

Service providers typically provide call center services to enable clients to access, modify, delete or otherwise control their accounts. From a security standpoint, call centers can be the riskiest areas of an enterprise because call center transactions may expose sensitive customer information to malicious third parties.

Call centers face both internal and external risks. Internal risks include employee theft of sensitive customer information. During a typical authentication process, call center employees have direct access to sensitive customer data. Call centers may be outsourced, and call center employees have a high turnover rate. As a result, companies are constantly at risk that departing or remote employees may improperly retain customer information.

External risks include those posed by "spoofing" and "phishing" where imposters mask or modify incoming numbers, email addresses, IP addresses, etc., to pose as clients in an attempt to steal information or funds. Hackers also pose external risks that monitor service provider communications, particularly call center communications, to steal customer information.

The Payment Card Industry Security Standards Council (PCI SSC) manages the ongoing evolution of the Payment Card Industry (PCI) security standards to address these security concerns. Service providers are responsible for enforcing compliance with PCI standards to protect sensitive customer data. For example, the PCI standards may dictate authentication standards to be followed prior to permitting a client to access and/or modify customer account information. Call centers may require client authentication in the form of the exchange of passwords, answers to personal questions, biometric data, or the like. Customers may be prompted multiple times to provide authentication information in various forms during the handling of a call. Not only can this authentication and re-authentication process frustrate a client and degrade the service provider's goodwill, each authentication instance potentially exposes sensitive customer information to potentially malicious parties.

BRIEF SUMMARY

In one aspect, embodiments include a computer-implemented method, which includes establishing, by a call center system, a call connection with a mobile device, determining, by the call center system, a call session identifier for the call connection and a phone number associated with the mobile device, sending, by the call center system, a text message to the mobile device based on the phone number, the text message includes the call session identifier and a mini-application link, the mini-application link configured to retrieve a code snippet from a server by the mobile device, receiving, by the call center system, authentication information and the call session identifier from the mobile device, the authentication information generated by a contactless card, determining, by the call center system, the authentication information is authentic and enabling, by the call center system, the call connection to continue for communications.

In one aspect, a call center system includes processing circuitry. The call center system also includes a memory storing instructions that, when executed by the processing system, cause the system to determine a call connection with a mobile device, determine a phone number associated with the mobile device, send a text message to the mobile device based on the phone number, the text message includes a mini-application link, the mini-application link configured to retrieve a code snippet on the mobile device, receive authentication information from the mobile device, the authentication information generated by a contactless card, authentic the authentication information, and enable, by the call center system, the call connection to continue for communications based on the authentication information being authentic.

In one aspect, embodiments systems and devices to perform computer-implemented methods and techniques including a computer-implemented method having establishing, by a mobile device, a call connection with a call center system, receiving, by the mobile device, a text message includes a call session identifier and a mini-application link, the mini-application link configured to retrieve a code snippet from a server, receiving, by the mobile device, the code snippet from the server, executing, by the mobile device, the code snippet, the code snippet causing a prompt to present on a display of the mobile device to tap a contactless card on or near the mobile device, receiving, by the mobile device, authentication information from the contactless card based on the tap of the contactless card on or near the mobile device, sending, by the mobile device, authentication information and the call session identifier, and maintaining, by the mobile device, the call connection with the call center system based on an indication the authentication information is authenticated.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates a routine 300 in accordance with embodiments.

FIG. 4 illustrates a routine 400 in accordance with embodiments.

FIG. 6 illustrates an example of a system 600 in accordance with embodiments.

FIG. 11 is a diagram of a key system according to an example embodiment.

FIG. 12 is a flowchart of a method of generating a cryptogram according to an example embodiment.

DETAILED DESCRIPTION

Embodiments are generally directed to systems and techniques to perform secure authentication operations utilizing a mini-application operating a customer's device, such as their mobile device or mobile phone. Thus, these techniques enable the secure authentication operations to be performed via a device without requiring downloading a large full application and improvements over previous technical solutions by minimizing download times and storage space required for the application.

For example, authentication of a customer may be required during a help or customer service call. Techniques discussed herein include sending a text message including a link to the mini-application to a device associated with the customer. The mini-application is downloaded and executed on the customer's device to perform the authentication. As discussed, the mini-application may include a minimal amount of executable instructions to perform the authentication. In one example, the authentication may be performed with a customer's contactless card. The customer may be asked to bring the card within a communication range of the device, e.g., to tap the card on the device, which initiates an exchange of data between the device and the contactless card. As part of the exchange, the card may send and/or the device may retrieve authentication information. The device may send the authentication information to a system to perform the authentication of the customer. Based on the result of the authentication, the call may be permitted to continue or may be canceled. These and other details will become more apparent in the following description.

Figure 1:
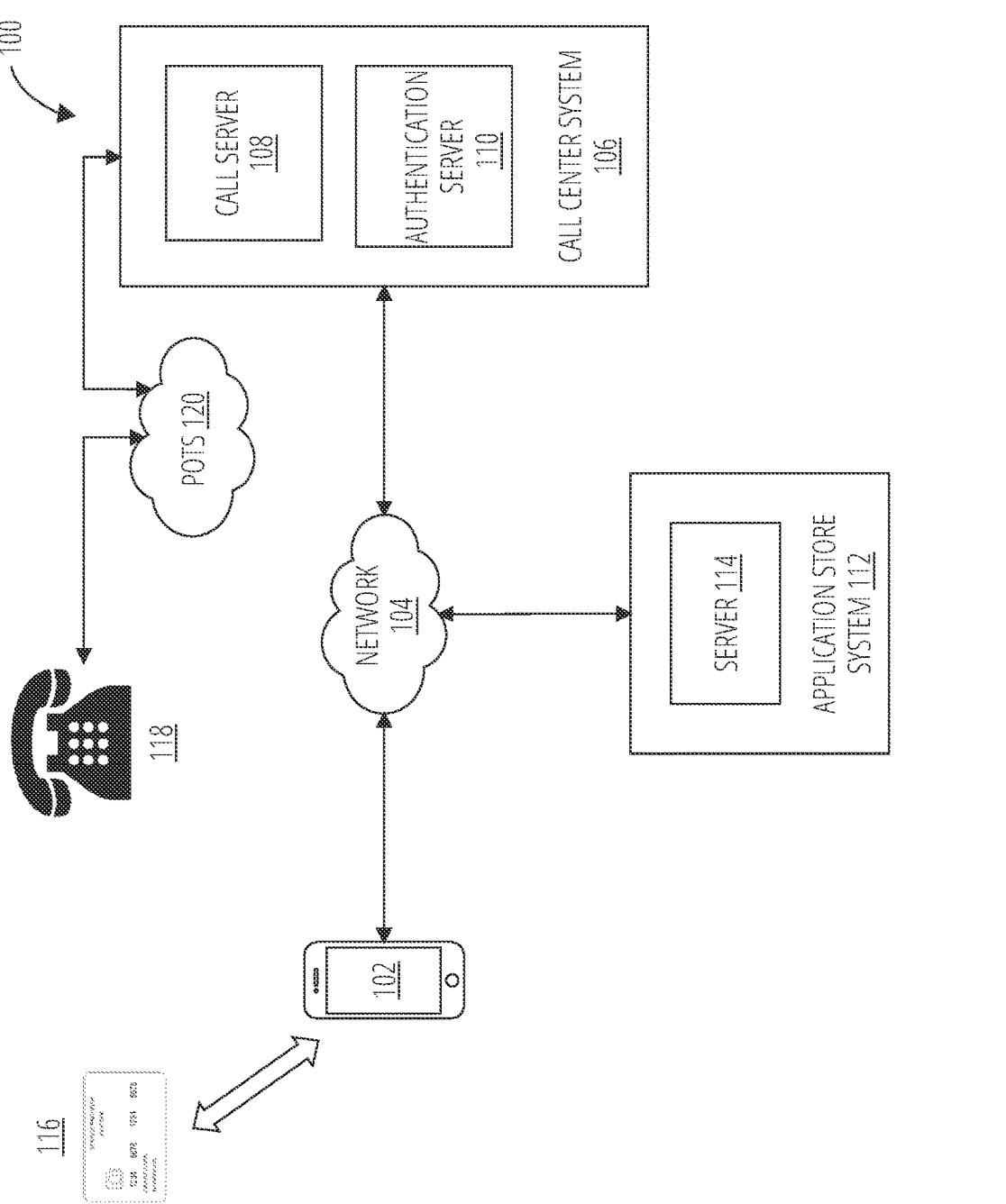
FIG. 1 illustrates an example of a system 100 in accordance with embodiments.

FIG. 1 illustrates an example of a system 100 in accordance with embodiments discussed herein. The illustrated system 100 is a simplified illustration for discussion purposes, and in implementation, the system 100 includes additional components not shown, such as networking components, additional servers and processing devices, and so forth.

The illustrated system 100 includes components and devices to perform and process call center communications and verify callers calling into the call center simplified and quickly compared to legacy authentication techniques. As previously discussed, embodiments discussed herein provide advantages over legacy systems by enabling customers to call into a call center and authenticate themselves using their contactless card without installing a full mobile application on a mobile device or another client device.

The call center system 106 may be configured to provide call center services to callers for a product or service. In one example, the call center system 106 may be implemented as part of a banking system and configured to provide call center services for the bank's customers. Thus, in some instances, the call center system may deal with sensitive information requiring that the caller be authenticated before discussing the information. The call center system 106 may include any number of components to enable a plurality of operators or call agents to handle calls and provide call center support. In FIG. 1, the call center system 106 includes a call server 108 and an authentication server 110. The call server 108 may be configured to provide call center services, including handling the calls and establishing call connections with other devices, providing user interfaces for support personnel and operators, accessing information and data to support calls, determining customer authentication is required, initiating authentication operation, and so forth. Note that the call server 108 may be a number of servers and other computing devices and equipment.

The authentication server 110 may perform authentication operations for the call center system 106. In the implementation, the authentication server 110 may include a number of servers and other computing devices and components. The authentication server 110 may be configured to register pending authentication operations, and perform authentication operations by comparing authentication information provided by the caller to authenticated information maintained by the authentication server 110, e.g., in a data store. The authentication server 110 may return the result of the authentication operation to the call server 108 to utilize whether to proceed with a call or not.

In embodiments, the call center system 106 is configured to handle telephone calls from any type of phone device, such as mobile device 102, telephone 118, or any other device used to make a call. Moreover, the call center system 106 may be configured to handle and process calls in accordance with different protocols, such as those required to handle calls on the Plain Old Telephone system (POTs 120) and the Voice over Internet Protocol (VoIP) system via network 104, which may include cellular communication protocols and landline protocols.

In a specific example, the call center system 106, including the call server 108, may receive or initiate a call with a device and establish a call connection with the device. Once established, the call server 108 may determine that an authentication routine or operation is required to support the call. For example, the call may deal with secure information, e.g., a bank account. The call server 108 may initiate an authentication routine to register a pending authentication with the authentication server 110 and to authenticate the caller or user on the phone.

The authentication server 110 may perform the authentication operation, including collecting information from the caller. As discussed herein, the call center system 106, including the authentication server 110 may utilize a mini-application or code snippet, such as an Apple® App Clip® or a Google® Instant App®, to perform the authentication routine and gather the authentication information from the caller. Utilizing the mini-application or code snippet provides improvements over legacy techniques because it enables the call center system 106 to securely and electronically collect data from the caller without the caller installing a bulky application that may require a long period of time. The mini-application or code snippet is specifically tailored to perform the operations to collect the authentication information and to provide the information authentication server 110 for further processing.

To provide the mini-application or code snippet to the customer, the call center system 106, including the call server 108 may register the authentication operation with the authentication server 110 to notify the authentication server 110 of the pending authentication and have a call session identifier generated associated with the authentication operation. Specifically, the call server may make an application programming interface (API) call to the authentication server to associate the caller's unique identifier, e.g., portable Unique Identifier (pUID), with the pending authentication to be performed by the authentication server. The authentication server may generate a session token or call session identifier for the pending authentication and return the call session identifier to the call server in response to the API call. The call session identifier may be provided in a text message to send to the mobile device. The call session identifier may be any unique combination of alphanumeric characters used to uniquely identify a pending authentication operation by the authentication server 110. The call session identifier may be a one-time use identify, and each pending authentication operation may be associated with a different identifier.

The call server 108 may generate a text message including a link to download and/or initiate the mini-application on a device associated with the caller. The text message may be communicated in accordance with any messaging protocol, e.g., short messaging service (SMS), multimedia messaging service (MMS), rich communication service (RCS), and so forth. The link may be a uniform resource locator (URL) link to a location to download the mini-application, e.g., an address of a server. In some embodiments, the link may point to a server 114 of an application store system 112, and the device may download the mini-application or code snippet from the application store system 112. In other instances, the call center system 106 may maintain the mini-application, and the user's device may download it from the call center system 106.

The call server 108 may send the text message to a device associated with the caller. In some instances, the call server 108 may send it to the device on which the caller is calling, such as a mobile device 102. However, in other instances, the calling device may not have text messaging capabilities, e.g., telephone 118, and the call server 108 may determine another device associated with the caller, such as a different mobile device or another computing device, to send the text message. To determine a device to send the message, the call server 108 may utilize the phone number associated with the call connection. For example, the call server 108 may determine the call number associated with a call connection with the mobile device 102 and send the mobile device 102 a text message. In another example, the call center system 106 may utilize the call number associated with a call connection with telephone 118 to perform a lookup to determine a different device to send the text message. In embodiments, other information may be used to determine the device to send the message, e.g., the caller may provide information such as their name, address, account number, etc.

In embodiments, the device, such as mobile device 102, may receive the text message to perform authentication from the call server 108. The text message includes the link, which may be selectable by a user. For example, the caller may use a touchscreen interface or another input device to select the link. The messaging program may be configured to process the link, e.g., launch an application to download the mini-application, automatically download the mini-application, or launch the mini-application.

The text message may also include the call session identifier in some instances. The call session identifier may be appended to a portion of the text message. In some instances, it may be embedded in the link, and in other instances, it may be separated from the link. In some embodiments, the device may receive the call session identifier in a different text message. The call session identifier may be a unique identifier associated with the authentication operation and may be sent back with authentication information for the authentication server 110 to perform the authentication.

In embodiments, the selectable link may include an address to the server, such as server 114 of the application store system 112, to download a mini-application or code snippet configured to perform the authentication. In response to being selected, the mobile device 102 may automatically download and execute the mini-application. In some instances, the mobile device 102 may already have the mini-application downloaded, e.g., from a previous authentication attempt, and selecting the link causes the mini-application to execute.

The mini-application or code snippet may be configured to execute on the mobile device 102 and include instructions to perform a single or a limited number of operations. Generally, the mini-application is much smaller in size than a full-size application, which is beneficial over legacy solutions by requiring less memory to execute and may be downloaded more quickly.

In accordance with embodiments, the mini-application or code snippet discussed herein may include instructions to cause a prompt to display on the display of the mobile device for a user to provide a contactless card on or near the mobile device and cause the mobile device to perform a wireless communication exchange, e.g., near-field communication (NFC), with contactless cards 116 to receive authentication information. The instructions may be configured to cause the mobile device 102 to communicate the authentication information and in some instances, the call session identifier to the authentication server 110. The code snippet may be configured to utilize an application programming interface (API) provided by the authentication server 110 to securely communicate the authentication information to the authentication server 110, e.g., in an API call. In some instances, the mobile device 102 may also communicate the call session identifier with the authentication information to the authentication server 110. The authentication server 110 can associate the authentication information with a particular pending/register and authentication routine. The mini-application or code snippet may include additional instructions that enable the performance of these operations, e.g., any files or runtime libraries required to perform the operations.

The authentication server 110 may process the authentication information to determine whether it is authentic. In embodiments, the authentication server 110 may receive the authentication information and the call session identifier from a mobile device 102, determine authenticated information associated with the contactless card/caller, and compare the authentication information to authenticated information to determine whether they match. In embodiments, authentication server 110 may utilize the call session identifier to determine the authenticated information associated with the contactless card or caller. For example, the authentication server 110 may perform a lookup based on the call session identifier to determine and retrieve the authenticated information from a data store. The data store may be any type of data store, such as a database configured to store authenticated information associated with customers and their contactless cards. In some instances, the call session identifier may be used to determine additional information relating to the caller to perform the lookup, e.g., an account number, a name, and an address, etc. This information may be correlated with the call session identifier when the authentication operation is registered.

In embodiments, the authentication server 110 compares to authenticated information to the authentication information received from the mobile device 102. If they match, the authentication server 110 may authenticate the contactless card and notify call server 108 and the operator. If they do not match, the authentication server 110 may not authenticate the contactless card and notify the call server 108 and the operator. In some instances, the authentication information may be encrypted, and the authentication server 110 may first decrypt the authentication information utilizing session keys derived from a master key, as discussed herein, e.g., FIG. 12 through FIG. 14. In response to the authentication information being authenticated, the 106 may enable the call to continue and maintain the call connection. If the authentication information is not authenticated, the call connection may be canceled or disconnected. FIG. 6 through FIG. 14 discuss additional details with respect to performing authentication with the data on the contactless card 116 and an authentication server.

In some embodiments, the caller may also perform an authentication operation to authenticate the operator of the call center system 106. In one example, the caller may send a text message with a code, e.g., an alphanumeric sequence, to the call center system 106. The code may be displayed to the operator, and the operator may read back the code. In embodiments, the caller may send the text message to a known phone number associated with call center system 106 known to be safe and/or legitimate. If the operator is not authenticated, the caller may determine to end the call connection. Alternatively, if the operator is authenticated, the caller determines to maintain the call connection.

Figure 2A:
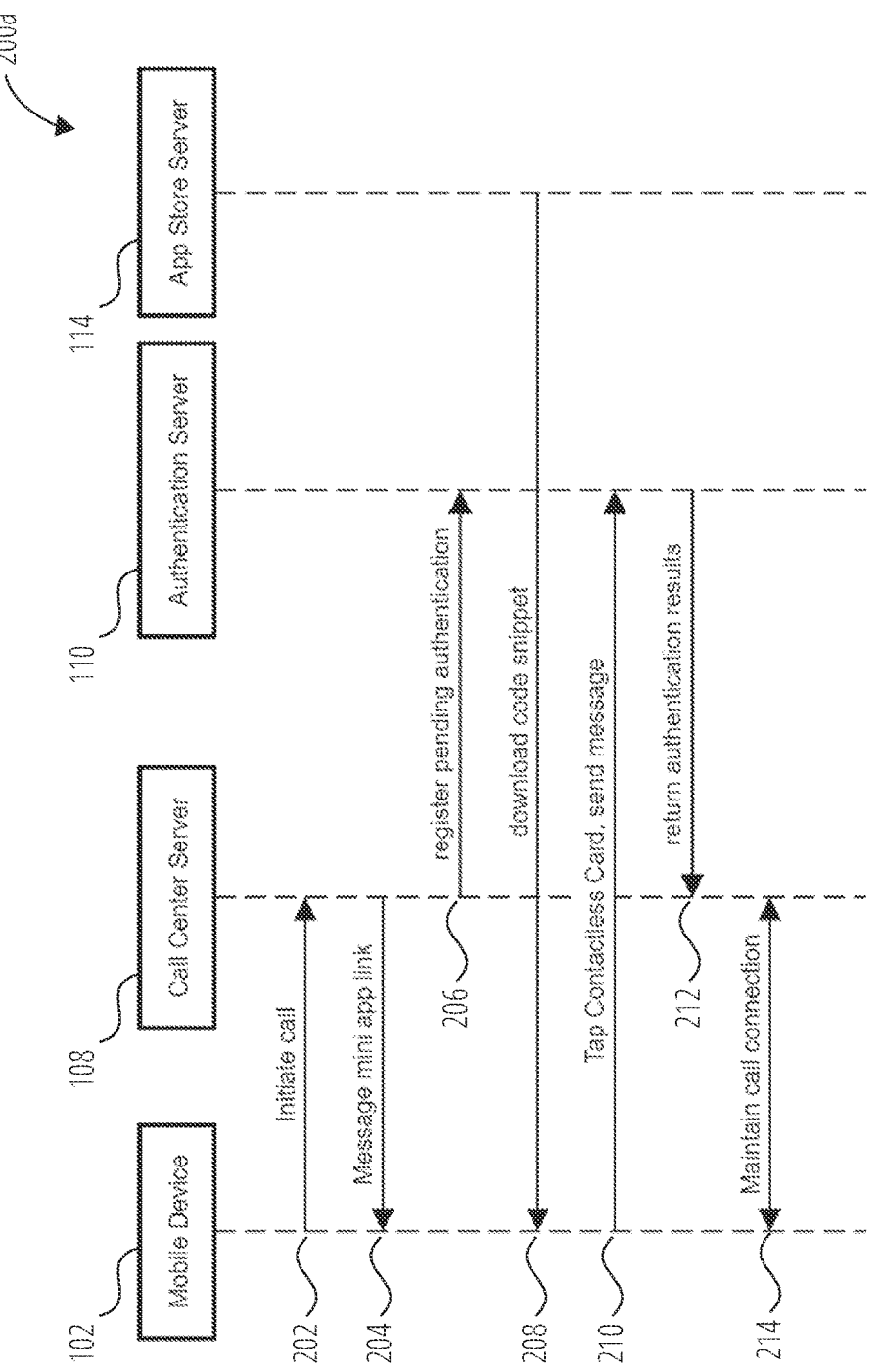
FIG. 2A illustrates an example of a sequence diagram 200a that may be performed in accordance with embodiments.
Figure 2B:
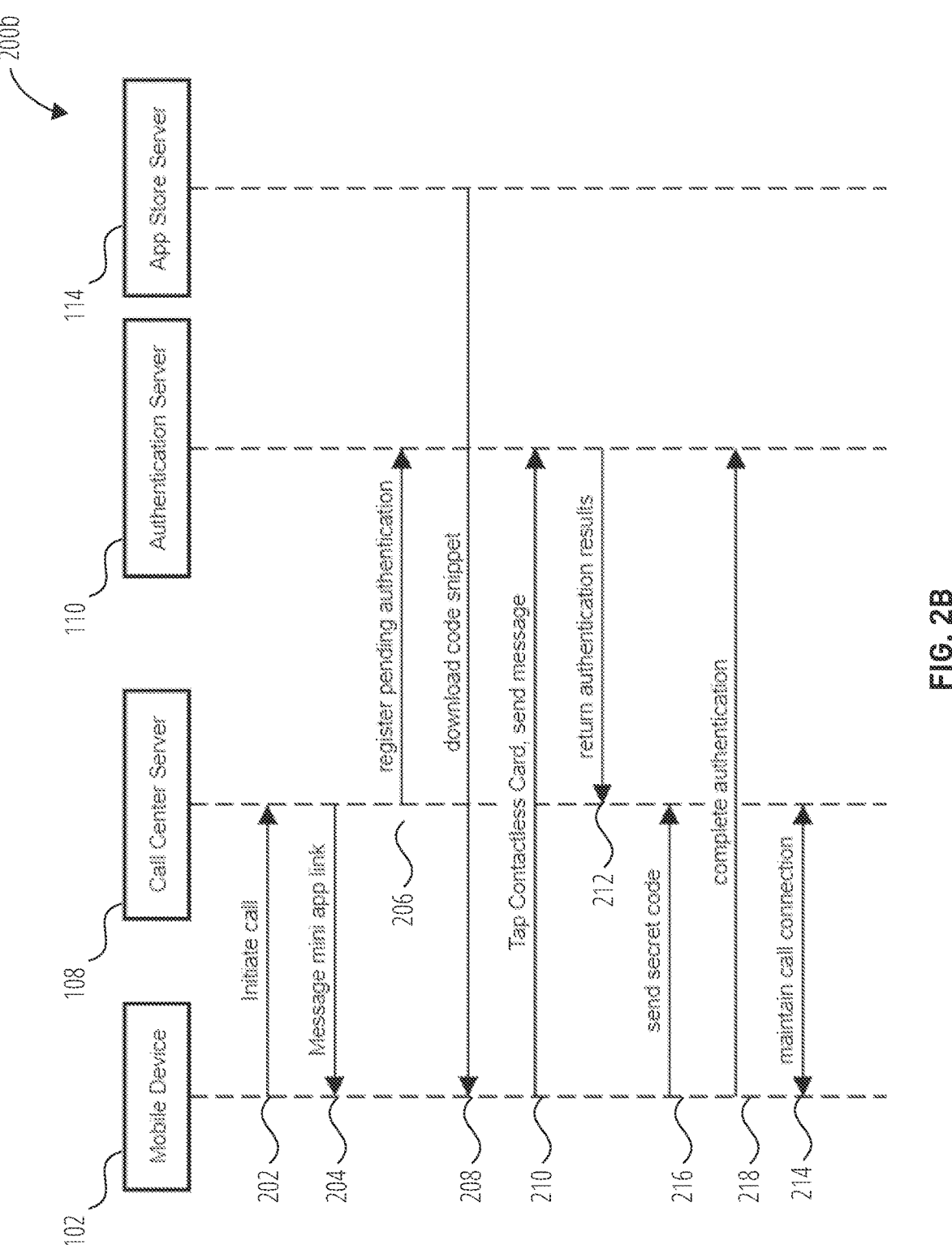
FIG. 2B illustrates an example of a sequence diagram 200b that may be performed in accordance with embodiments.

FIG. 2A and FIG. 2B illustrates example sequence flows 200a and 200b that may be performed in accordance with embodiments to authenticate a caller by a call center. In addition to authenticating the caller, FIG. 2B extends the sequence and includes authenticating the operator by the caller.

In embodiments, a call may be initiated between a mobile device 102 and a call server 108 at line 202. The call may be initiated by the mobile device 102, or the call server 108, and embodiments are not limited in this manner. Initiating a call may include establishing a call connection between the mobile device 102 and the call server 108. Therefore, the call may be conducted over a POTs system, a VoIP system, or a combination. Further, embodiments are not limited to calls with mobile devices, and calls may be conducted with older telephones and/or non-mobile devices.

At line 204, the sequence includes the call server 108 sending a text message including a mini-application link to the call server 108. Although not illustrated in this manner, the call server 108 may also register a pending authentication for the call with the authentication server 110 at line 206 in parallel. In some instances, the call server 108 may first register the authentication and receive a call session identifier to include in the text message. In other instances, the call server 108 may send a second message to the mobile device 102 with the call session identifier.

Registering the authentication operation may include generating the call session identifier and determining authenticated information associated with the call. For example, the authentication server 110 may determine the authenticated information based on information associated with call, e.g., a telephone number, a caller name, an account number, an address, etc.

At line 208, the sequence includes the mobile device 102 downloading a code snippet from server 114, e.g., an app store server. In embodiments, the code snippet may be downloaded based on a user of the mobile device 102 selecting the mini-app link in the text message sent by the call server 108. The code snippet may be configured to execute on the mobile device 102 to perform authentication operations. For example, the code snippet may cause a message to display on the mobile device 102 to tap a contactless card to the mobile device 102. At line 210, the caller may tap a contactless card to the mobile device 102, the mobile device 102 may receive authentication information from the card, as previously discussed. Further and at line 210, the mobile device also sends the authentication information to the authentication server 110. The mobile device 102 may send the call session identifier with the authentication information to the authentication server 110.

The authentication server 110 may perform an authentication operation on the authentication information. For example, the authentication server 110 may compare the authentication information to authenticated information. If they match, the authentication server 110 may authenticate the authentication information; however, if they do not match, the authentication server 110 may not authenticate the authentication information. At line 212, the authentication server 110 may return a result of the authentication to the call server 108.

At line 214, the call connection is maintained between the mobile device 102 and the 108 based on authenticated authentication information. If the authentication information is not authenticated, the call connection between the mobile device 102 and the call server 108 would end.

Sequence diagram 200b illustrates the same flow as sequence diagram 200a; however, the caller may perform an authentication step to authenticate the operator. For example, at line 216, the caller and mobile device 102 may communicate a secret code to the call server 108. The call server 108 may present the secret code to an operator of the call server 108. The operator may read back the code over the voice connection, and the caller may confirm the operator's authentication. For example, at line 218 the mobile device 102 may send an indication of the result of the operator authentication server 114. Embodiments are not limited to the specific sequence illustrated in FIGS. 2a/2b. In some instances, one or more of the operations may happen before other operations.

FIG. 3 illustrates an example routine 300 that the systems discussed herein may perform. For example, a call center system including one or more servers may perform one or more of the following options. Note that one or more of the operations may be performed by different servers and/or systems in some instances. For example, a call server may process one or more of the operations for a call connection, while an authentication server may perform one or more operations to authenticate a caller. In other instances, the operations may be performed on a single server or computing device or on multiple servers or computing devices.

In block 302, routine 300 includes establishing a call connection with a mobile device. For example, a call center system may make a call connection with a mobile device based on the mobile device calling into a helpline or contact number. In other instances, the call center system may originate the call connection with the mobile device. The call connection may be made over any type of voice communication protocol or connection, e.g., Plain Old Telephone Service (POTS), cellular protocol, WiFi protocol, Voice over Internet Protocol (VoIP), etc.

In embodiments, the call center system may first determine to perform one or more authentication operations to authenticate the caller using the mobile device. In block 304, routine 300 includes determining a call session identifier for the call connection and a phone number associated with the mobile device. To determine the call session identifier, a call center system's call server may communicate and register the call connection with an authentication server of an authentication system. Specifically, the call server may make an application programming interface (API) call to the authentication server to associate the caller's unique identifier, e.g., portable Unique Identifier (pUID), with the pending authentication to be performed by the authentication server. The authentication server may generate a session token or call session identifier for the pending authentication and return the call session identifier to the call server in response to the API call. The call session identifier may used by the authentication server to identify which pending authentication it is performing and where to return the authentication result.

The call center system may also determine a phone number associated with the call connection. For example, the call center system may determine the phone number based on information in the call itself. In another example, the call center system may perform a lookup of an account based on information provided by the caller. In a third example, the caller may provide the phone number, e.g., via a voice input or touchpad input. The phone number may be used to communicate back to the mobile device.

For example, in block 306, routine 300 includes sending a text message to the mobile device based on the phone number. The text message may include the call session identifier and a mini-application link. The mini-application link is configured to retrieve a code snippet from a server by the mobile device. In embodiments, the mini-application link may be a uniform resource locator (URL) to an address of a server to download the mini-application. In some instances, the server may be part of an application store, such as the Google® Play® store or the Apple® App Store®. In other instances, the server may be part of the call center system, and embodiments are not limited in this manner.

In embodiments, the mini-application may be a code snippet, e.g., a small portion of executable code, that may be configured to execute on the mobile device. In some instances, the mini-application may be an Apple® App Clip® or an Android® Instant App®. However, embodiments are not limited to these examples.

As discussed in more detail in FIG. 4, the mobile device may download or retrieve the code snippet and execute the code snippet. The code snippet may perform one or more operations on the mobile device, including determining authentication information and communicating the authentication information to the call center system, e.g., the authentication server, to authenticate the authentication information. In some instances, the mobile device may also communicate the call session identifier with the authentication information to the call center system such that it can associate the authentication information with a pending authentication operation or request.

In block 308, the routine 300 includes receiving authentication information and the call session identifier from the mobile device. In some instances, the authentication information and call session identifier is received by an authentication server. In block 310, the routine 300 determines the authentication information is authentic. For example, the authentication server may compare the authentication information with stored authentic information. As previously discussed, the call session identifier may be associated with the caller (pUID) and with a particular authentication operation during a registration process. The authentication server may utilize the call session identifier to determine the authentic information associated with the caller by performing a lookup in a data store.

In embodiments, the result of the comparison may be returned to a call center server or another device and based on the result, and the call connection may be maintained or closed. In this example, the authentication information is successfully authenticated. In block 312, routine 300 includes enabling the call connection to continue for communications.

FIG. 4 illustrates an example of a routine 400 that may be performed in accordance with embodiments discussed herein. In some examples, the routine 400 may be performed by a computing device, such as a mobile phone or a mobile device. Embodiments are not limited to these examples.

In block 402, the routine 400 includes establishing a call connection with a call center system. The call connection may be established based on a caller using the mobile device to call the call center system. In other instances, the call connection may be established by the call center system calling the mobile device, e.g., a return support call.

In block 404, the routine 400 includes receiving a text message comprising a call session identifier and a mini-application link. The text message may be generated and sent by the call center system in embodiments. As discussed, the mini-application link may be a URL or another type of selectable link to an address to download a mini-application, such as the code snippet. In some instances, a caller may select the mini-application link, and the mobile device may download or retrieve the code snippet from the location specified by the link. In some instances, the code snippet may be automatically downloaded upon receiving the text message. In block 406, routine 400 receives the code snippet from the server by the mobile device.

In block 408, the routine 400 includes executing the code snippet. The code snippet may be an executable portion of code in some embodiments. The code snippet may be configured to perform an authentication operation on the mobile device. The authentication may be performed utilizing a contactless card in embodiments discussed herein. For example, the code snippet may execute, causing a display to be presented on a display of the mobile device. The display may instruct the caller to tap a contactless card on the surface of the mobile device or bring the card close to the mobile device. Bringing the card with a specified range, e.g., an NFC communication range, causes an exchange of data between the mobile device and the contactless card, as discussed herein in FIGS. 5-14. The contactless card may provide authentication information, such as encrypted data in a cryptogram.

In block 410, the routine 400 includes receiving authentication information from the contactless card based on the tap of the contactless card on or near the mobile device. For example, the contactless card may communicate the authentication information to the mobile device in an NFC exchange. Embodiments are not limited in this manner, and the authentication information may be communicated in accordance with other short-range communication protocols, such as Bluetooth®, WiFi, RF, etc.

In block 412, routine 400 includes sending the authentication information and the call session identifier to the call center system. For example, the mobile device may send the authentication information and call session identifier to an authentication server of the call center system to perform authentication operations on the information, e.g., determine that there is a match between the authentication information and authenticated information stored on the authentication system. The authentication system may perform the authentication operations and determine a result that may be provided to a call center server and/or the mobile device. Based on the result, the call center system and/or the mobile device may determine whether to proceed with the call connection or cease the connection, i.e., hang-up. The call connection is maintained between the call center system and the mobile device in this routine. In block 414, the routine 400 includes maintaining the call connection with the call center system based on an indication the authentication information is authenticated.

Figure 5:
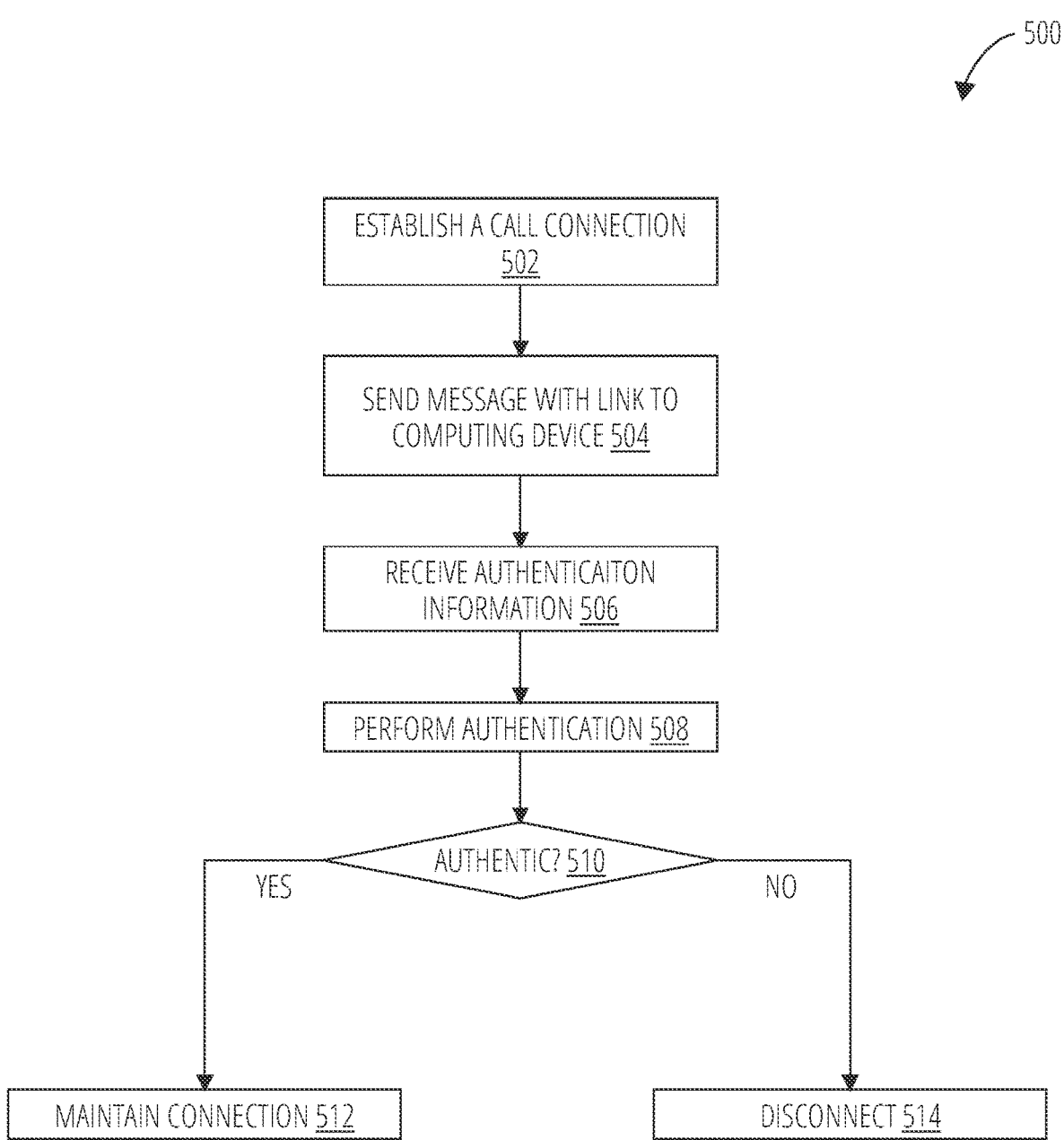
FIG. 5 illustrates a processing flow 500 in accordance with embodiments.

FIG. 5 illustrates an example of a processing flow 500 that a call center system may perform authentication operations to determine whether to continue with a call. These operations may be performed by one or more servers of the call center system, and embodiments are not limited in this manner. At block 502, the processing flow 500 includes establishing a call with a telephone device, such as a mobile device or another telephone. The call connection can be made over a VoIP connection, POTs connection, or another type of connection. Further, the connection may be initiated by the call center system or the other device.

The call center system may determine to perform authentication to authenticate the caller/user of the other device. In embodiments, the authentication may be performed by having the caller provide an additional piece of information, i.e., authentication information. In one example, the call center system may request that the caller provide authentication information generated by a contactless card by utilizing a mini-application, such as an App Clip® or an Instant App®. The mini-application may be downloaded on the telephone device with which the call connection is made with another device associated with the caller, e.g., a different mobile device.

At block 504, the processing flow 500 includes sending a text message to another device to perform an authentication of the caller. In embodiments, the text message may be sent by the call center system and include a mini-application link, such as a URL, that may be used to download the mini-application to the device. Thus, when a user selects the link, the mini-application may download from a server hosting the application. Note that in some instances, the min application may already be installed and/or downloaded on the device, and the selection of the link may cause the mini-application to execute without requiring a download. The link may be to an address of a server of the call center system or an application store hosting the mini-application.

At block 506, the processing flow 500 includes receiving authentication information. In one example, the mobile device may send, and the call center system including an authentication server, may receive the authentication information. The authentication information may be collected by the mobile device. For example, the authentication information may be generated by a contactless card, and the mobile device may read the information from the card. Embodiments support other authentication information collected. For example, the additional authentication information may include a password or pin entered by a user, a biometric collected by the mobile device, or another piece of information known to the caller and the authentication system. Embodiments are not limited in this manner.

At block 508, the processing flow 500 includes performing an authentication operation on the authentication information. Specifically, the authentication server may compare the authentication information to know valid and authentic information maintained by the call center system. In some embodiments, the authentication server may determine the valid and authentic data in the call center system by performing a lookup in a data store with an identifier, e.g., call session identifier.

At decision block 510, the processing flow 500 includes determining whether the authentication information is valid or not valid based on the result of the comparison. If the information is not authenticated, the processing flow 500 may proceed to block 514, and the call connection may disconnect. If the information is authenticated, the processing flow 500 may proceed t0 block 512, and the connection may be maintained. In some embodiments, the caller may also perform an authentication, e.g., by providing a piece of information that may be read back to the caller, as previously discussed.

FIG. 6 illustrates a data transmission system 600 according to example embodiments. The system 600 may be one example configuration to perform authentication operations with a contactless card, including generating authentication information and communicating the authentication information to an authentication server 110. As further discussed below, system 600 may include contactless card 116, mobile device 102, network 602, and authentication server 110. Although FIG. 6 illustrates single instances of the components, system 600 may include any number of components.

System 600 may include one or more contactless cards 116, which are further explained below. In some embodiments, contactless card 116 may be in wireless communication, utilizing near-field communication (NFC) in an example, with mobile device 102.

System 600 may include mobile device 102, or a client device. In some embodiments, the client device may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. The mobile mobile device 102 may be any type of mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The mobile device 102 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The mobile device 102 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, mobile device 102 of system 600 may execute one or more applications, such as software applications, that enable, for example, network communications with one or more components of system 600 and transmit and/or receive data.

The mobile device 102 may be in communication with one or more server(s) 110 via one or more network(s) 602, and may operate as a respective front-end to back-end pair with the authentication server 110, for example. The mobile device 102 may transmit, for example from a mobile device mini-application, executing on mobile device 102, one or more requests to authentication server 110. The one or more requests may be associated with retrieving or sending data from authentication server 110. The authentication server 110 may receive the one or more requests from mobile device 102. Based on the one or more requests from mobile device 102, authentication server 110 may be configured to perform one or more operations to authenticate authentication information.

System 600 may include one or more networks 602. In some examples, network 602 may be one or more of a wireless network, a wired network or any combination of wireless network and wired network, and may be configured to connect mobile device 102 to authentication server 110. For example, network 602 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1202.11 family of networking, Bluetooth, NFC, Radio Frequency Identification (RFID), Wi-Fi, and/or the like.

In addition, network 602 may include, without limitation, telephone lines, fiber optics, IEEE Ethernet 802.3, a wide area network, a wireless personal area network, a LAN, or a global network such as the Internet. In addition, network 602 may support an Internet network, a wireless communication network, a cellular network, or the like, or any combination thereof. network 602 may further include one network, or any number of the exemplary types of networks mentioned above, operating as a stand-alone network or in cooperation with each other. network 602 may utilize one or more protocols of one or more network elements to which they are communicatively coupled. network 602 may translate to or from other protocols to one or more protocols of network devices. Although network 602 is depicted as a single network, it should be appreciated that according to one or more examples, network 602 may comprise a plurality of interconnected networks, such as, for example, the Internet, a service provider's network, a cable television network, corporate networks, such as credit card association networks, and home networks.

System 600 may include one or more authentication servers 110. In some examples, authentication server 110 may include one or more processors, which are coupled to memory. The authentication server 110 may be configured as a central system, server or platform to control and call various data at different times to execute a plurality of workflow actions. authentication server 110 may be configured to connect to other devices and systems including one or more databases configured to store authenticated information. The authentication server 110 may be connected to at least one mobile device 102.

Figure 7:
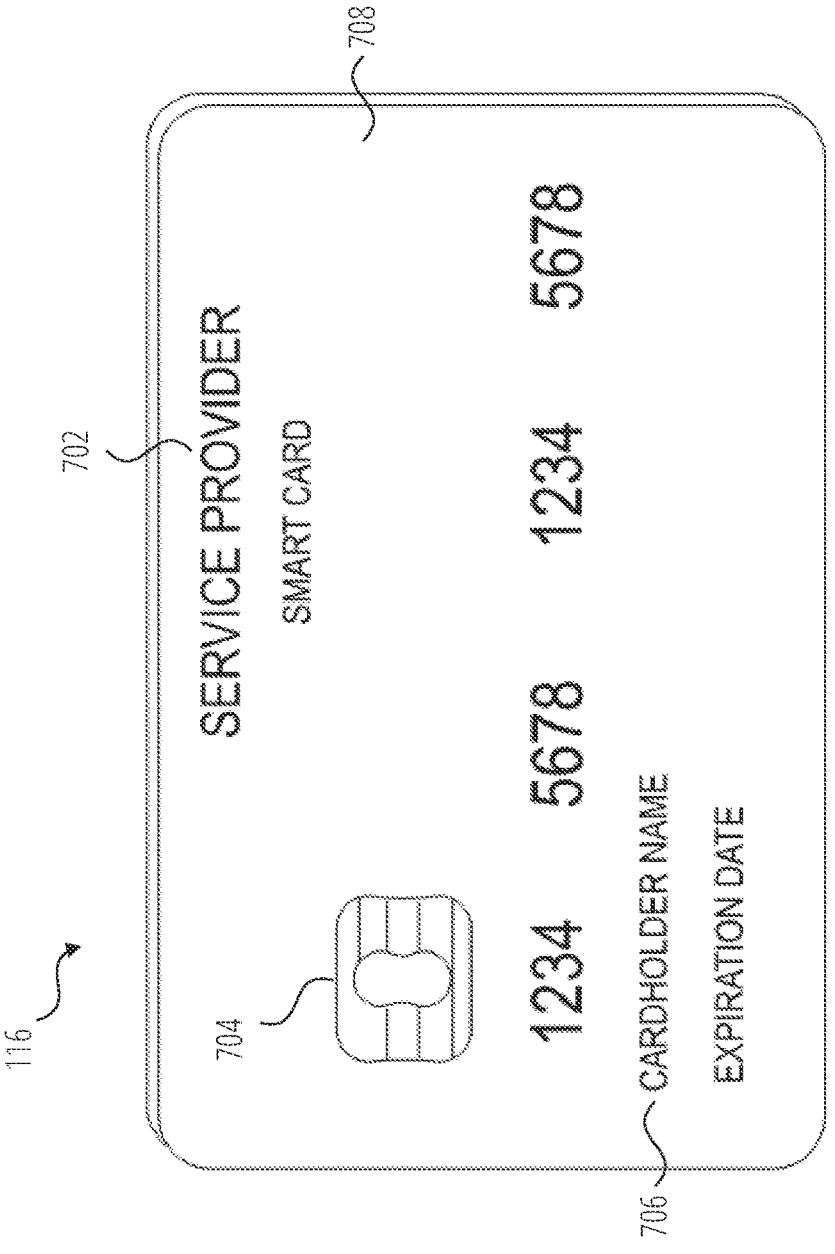
FIG. 7 illustrates a contactless card 116 in accordance with one embodiment.
Figure 8:
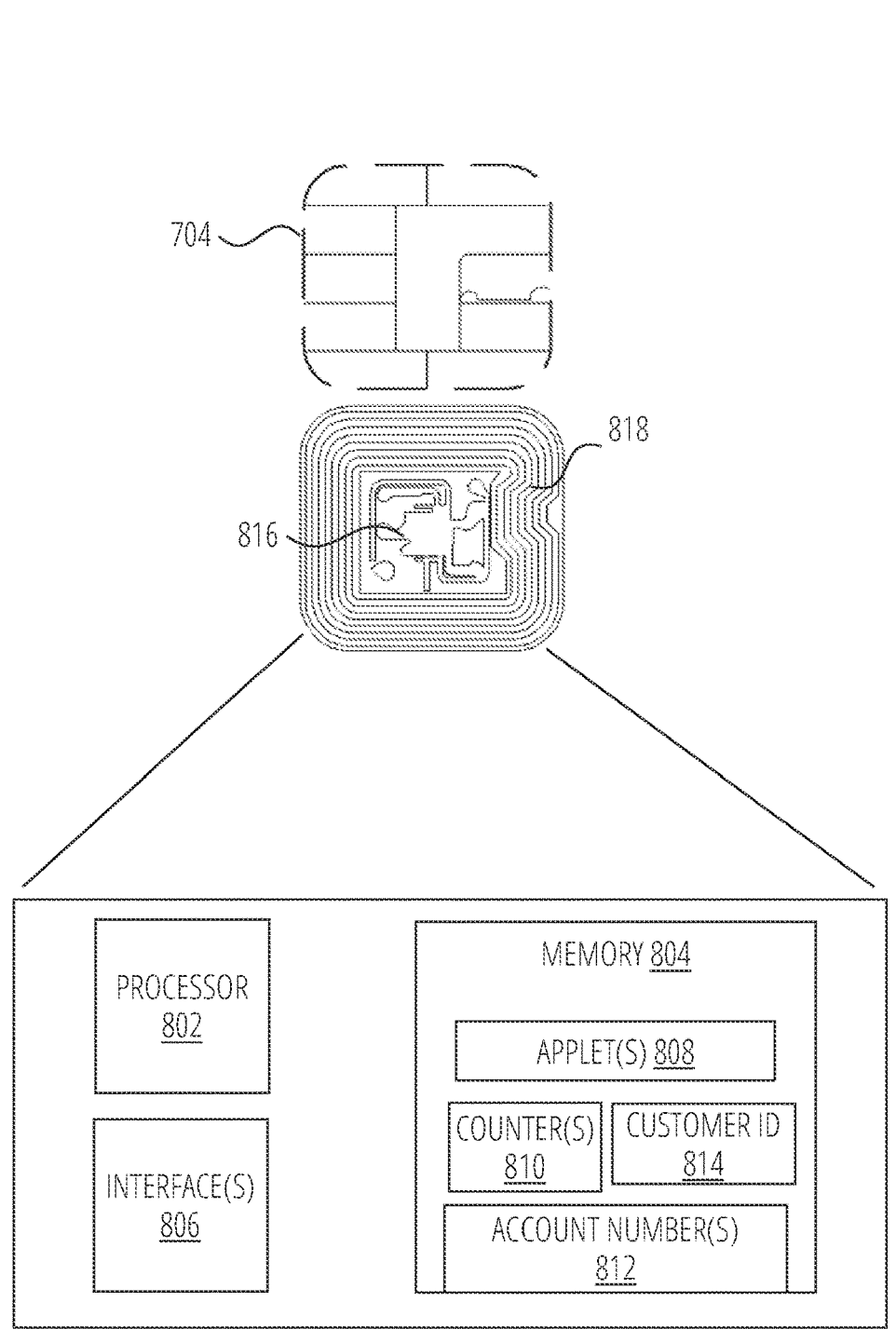
FIG. 8 illustrates a transaction card component 800 in accordance with one embodiment.

FIG. 7 illustrates an example configuration of a contactless card 116, which may include a payment card, such as a credit card, debit card, or gift card, issued by a service provider as displayed as service provider indicia 702 on the front or back of the contactless card 116. In some examples, the contactless card 116 is not related to a payment card, and may include, without limitation, an identification card. In some examples, the transaction card may include a dual interface contactless payment card, a rewards card, and so forth. The contactless card 116 may include a substrate 708, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 116 may have physical characteristics compliant with the ID-1 format of the ISO/IEC 7816 standard, and the transaction card may otherwise be compliant with the ISO/IEC 14443 standard. However, it is understood that the contactless card 116 according to the present disclosure may have different characteristics, and the present disclosure does not require a transaction card to be implemented in a payment card.

The contactless card 116 may also include identification information 706 displayed on the front and/or back of the card, and a contact pad 704. The contact pad 704 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 116 may also include processing circuitry, antenna and other components as will be further discussed in FIG. 8. These components may be located behind the contact pad 704 or elsewhere on the substrate 708, e.g. within a different layer of the substrate 708, and may electrically and physically coupled with the contact pad 704. The contactless card 116 may also include a magnetic strip or tape, which may be located on the back of the card (not shown in FIG. 7). The contactless card 116 may also include a Near-Field Communication (NFC) device coupled with an antenna capable of communicating via the NFC protocol. Embodiments are not limited in this manner.

As illustrated in FIG. 7, the contact pad 704 of contactless card 116 may include processing circuitry 816 for storing, processing, and communicating information, including a processor 802, a memory 804, and one or more interface(s) 806. It is understood that the processing circuitry 816 may contain additional components, including processors, memories, error and parity/CRC checkers, data encoders, anticollision algorithms, controllers, command decoders, security primitives and tamperproofing hardware, as necessary to perform the functions described herein.

The memory 804 may be a read-only memory, write-once read-multiple memory or read/write memory, e.g., RAM, ROM, and EEPROM, and the contactless card 116 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 804 may be encrypted memory utilizing an encryption algorithm executed by the processor 802 to encrypted data.

The memory 804 may be configured to store one or more applet(s) 808, one or more counter(s) 810, a customer identifier 814, and the account number(s) 812, which may be virtual account numbers. The one or more applet(s) 808 may comprise one or more software applications configured to execute on one or more contactless cards, such as a Java® Card applet. However, it is understood that applet(s) 808 are not limited to Java Card applets, and instead may be any software application operable on contactless cards or other devices having limited memory. The one or more counter(s) 810 may comprise a numeric counter sufficient to store an integer. The customer identifier 814 may comprise a unique alphanumeric identifier assigned to a user of the contactless card 116, and the identifier may distinguish the user of the contactless card from other contactless card users. In some examples, the customer identifier 814 may identify both a customer and an account assigned to that customer and may further identify the contactless card 116 associated with the customer's account. As stated, the account number(s) 812 may include thousands of one-time use virtual account numbers associated with the contactless card 116. An applet(s) 808 of the contactless card 116 may be configured to manage the account number(s) 812 (e.g., to select an account number(s) 812, mark the selected account number(s) 812 as used, and transmit the account number(s) 812 to a mobile device for autofilling by an autofilling service. In some embodiments, the applet(s) 808 are configured to generate authentication information as will be discussed in more detail herein.

The processor 802 and memory elements of the foregoing exemplary embodiments are described with reference to the contact pad 704, but the present disclosure is not limited thereto. It is understood that these elements may be implemented outside of the contact pad 704 or entirely separate from it, or as further elements in addition to processor 802 and memory 804 elements located within the contact pad 704.

In some examples, the contactless card 116 may comprise one or more antenna(s) 818. The one or more antenna(s) 818 may be placed within the contactless card 116 and around the processing circuitry 816 of the contact pad 704. For example, the one or more antenna(s) 818 may be integral with the processing circuitry 816 and the one or more antenna(s) 818 may be used with an external booster coil. As another example, the one or more antenna(s) 818 may be external to the contact pad 704 and the processing circuitry 816.

In an embodiment, the coil of contactless card 116 may act as the secondary of an air core transformer. The terminal may communicate with the contactless card 116 by cutting power or amplitude modulation. The contactless card 116 may infer the data transmitted from the terminal using the gaps in the contactless card's power connection, which may be functionally maintained through one or more capacitors. The contactless card 116 may communicate back by switching a load on the contactless card's coil or load modulation. Load modulation may be detected in the terminal's coil through interference. More generally, using the antenna(s) 818, processor 802, and/or the memory 804, the contactless card 101 provides a communications interface to communicate via NFC, Bluetooth, and/or Wi-Fi communications.

As explained above, contactless card 116 may be built on a software platform operable on smart cards or other devices having limited memory, such as JavaCard, and one or more or more applications or applets may be securely executed. Applet(s) 808 may be added to contactless cards to provide a one-time password (OTP) for multifactor authentication (MFA) in various mobile application-based use cases. Applet(s) 808 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 808 may be configured to encode the OTP as an NDEF type 4 well known type text tag. In some examples, NDEF messages may comprise one or more records. The applet(s) 808 may be configured to add one or more static tag records in addition to the OTP record.

In some examples, the one or more applet(s) 808 may be configured to emulate an RFID tag. The RFID tag may include one or more polymorphic tags. In some examples, each time the tag is read, different cryptographic data is presented that may indicate the authenticity of the contactless card. Based on the one or more applet(s) 808, an NFC read of the tag may be processed, the data may be transmitted to a server, such as a server of a banking system, and the data may be validated at the server.

In some examples, the contactless card 116 and server may include certain data such that the card may be properly identified, e.g., authentication information. The contactless card 116 may include one or more unique identifiers (not pictured). Each time a read operation takes place, the counter(s) 810 may be configured to increment. In some examples, each time data from the contactless card 116 is read (e.g., by a mobile device), the counter(s) 810 is transmitted to the server for validation and determines whether the counter(s) 810 are equal (as part of the validation) to a counter of the server.

The one or more counter(s) 810 may be configured to prevent a replay attack. For example, if a cryptogram has been obtained and replayed, that cryptogram is immediately rejected if the counter(s) 810 has been read or used or otherwise passed over. If the counter(s) 810 has not been used, it may be replayed. In some examples, the counter that is incremented on the card is different from the counter that is incremented for transactions. The contactless card 101 is unable to determine the application transaction counter(s) 810 since there is no communication between applet(s) 808 on the contactless card 116.

In some examples, the counter(s) 810 may get out of sync. In some examples, to account for accidental reads that initiate transactions, such as reading at an angle, the counter(s) 810 may increment but the application does not process the counter(s) 810. In some examples, when the mobile device 10 is woken up, NFC may be enabled and mobile device 102 may be configured to read available tags, but no action is taken responsive to the reads.

To keep the counter(s) 810 in sync, an application, such as a background application, may be executed that would be configured to detect when the mobile device 110 wakes up and synchronize with the server of a banking system indicating that a read that occurred due to detection to then move the counter forward. In other examples, Hashed One Time Password may be utilized such that a window of mis-synchronization may be accepted. For example, if within a threshold of 10, the counter(s) 810 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 810 increases in the appropriate sequence, then it possible to know that the user has done so.

The key diversification technique described herein with reference to the counter(s) 810, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 116, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 116. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication information included in an authentication message may be delivered as the content of a text NDEF record in hexadecimal ASCII format. In another example, the NDEF record may be encoded in hexadecimal format.

Figure 9:
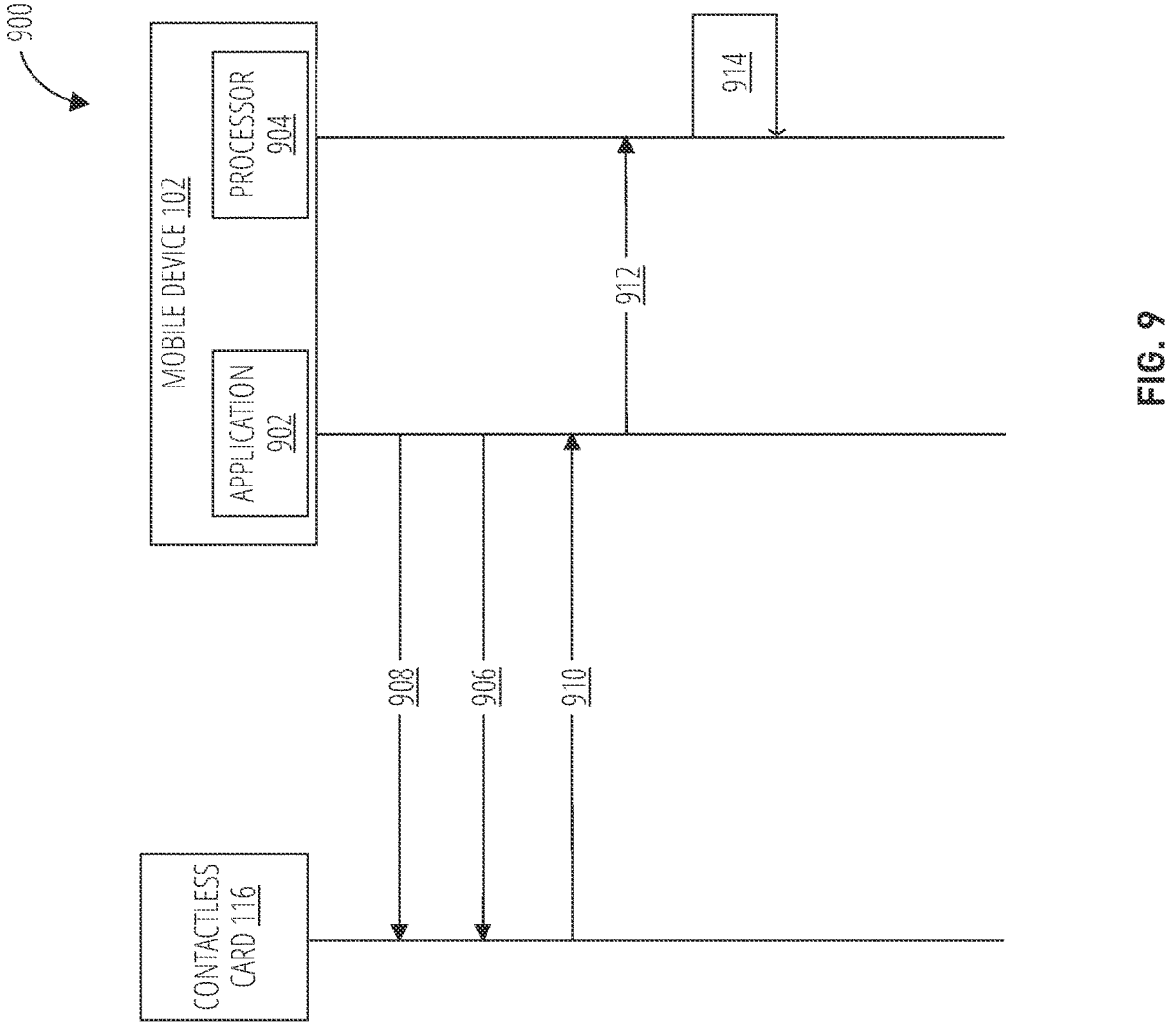
FIG. 9 illustrates a sequence flow 900 in accordance with one embodiment.

FIG. 9 is a timing diagram illustrating an example sequence for providing authentication information according to one or more embodiments of the present disclosure. Sequence flow 900 may include contactless card 116 and mobile device 102, which may include an application 902, such as a mini-application or a code snippet as discussed herein, and processor 904.

At line 908, the application 902 communicates with the contactless card 116 (e.g., after being brought near the contactless card 116). Communication between the application 902 and the contactless card 116 may involve the contactless card 116 being sufficiently close to a card reader (not shown) of the mobile device 102 to enable NFC data transfer between the application 902 and the contactless card 116.

At line 906, after communication has been established between mobile device 102 and contactless card 116, contactless card 116 generates a message authentication code (MAC) cryptogram. In some examples, this may occur when the contactless card 116 is read by the application 902. In particular, this may occur upon a read, such as an NFC read, of a near field data exchange (NDEF) tag, which may be created in accordance with the NFC Data Exchange Format. For example, a reader application, such as application 902, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 116 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 902 may be configured to transmit a request to contactless card 116, the request comprising an instruction to generate a MAC cryptogram.

At line 910, the contactless card 116 sends the MAC cryptogram to the application 902. In some examples, the transmission of the MAC cryptogram occurs via NFC, however, the present disclosure is not limited thereto. In other examples, this communication may occur via Bluetooth, Wi-Fi, or other means of wireless data communication. At line 912, the application 902 communicates the MAC cryptogram to the processor 904.

At line 914, the processor 904 verifies the MAC cryptogram pursuant to an instruction from the application 122. For example, the MAC cryptogram may be verified, as explained below. In some examples, verifying the MAC cryptogram may be performed by a device other than mobile device 102, such as a server of a banking system in data communication with the mobile device 102. For example, processor 904 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 10:
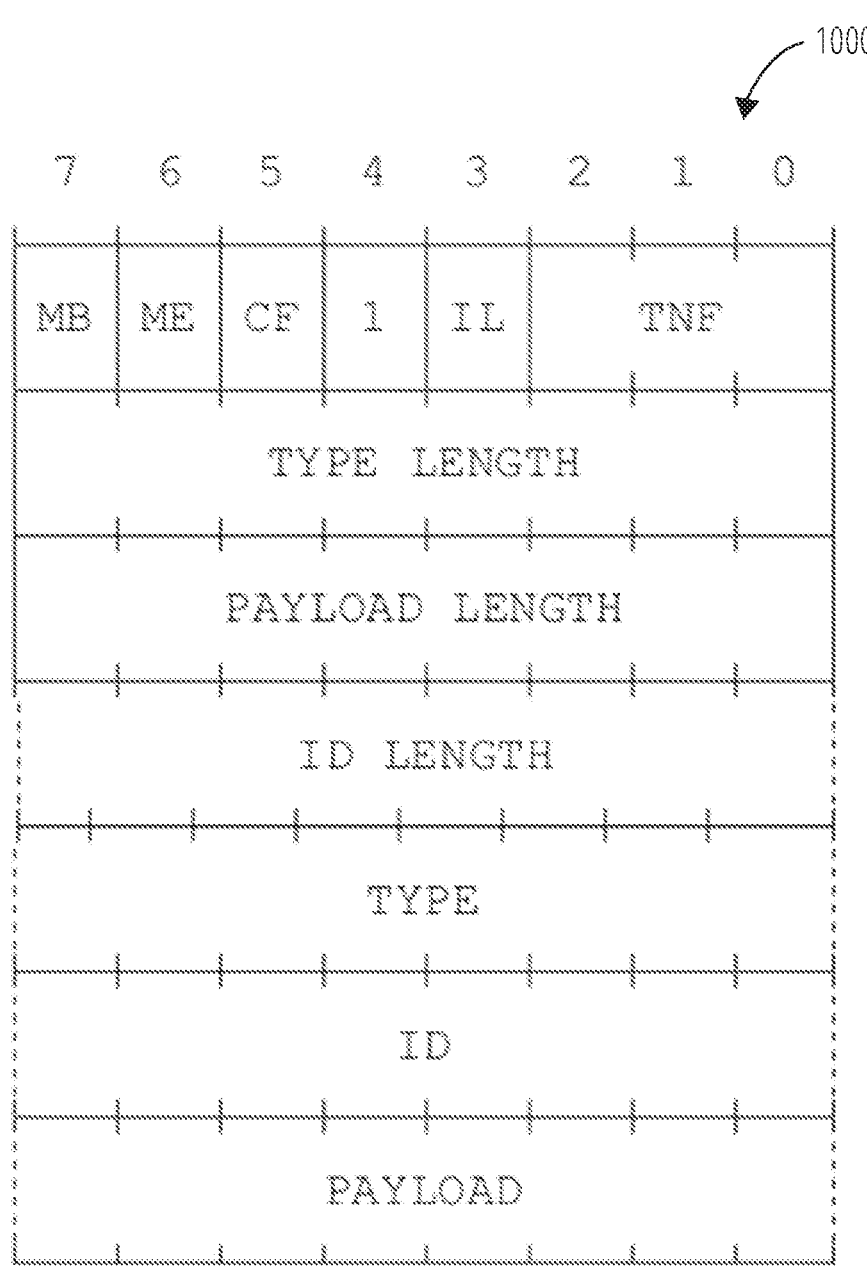
FIG. 10 illustrates a data structure 1000 in accordance with one embodiment.

FIG. 10 illustrates an NDEF short-record layout (SR=1) data structure 1000 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication information.

FIG. 11 illustrates a diagram of a system 1100 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1102, 1126 may be required for each part of the portfolio on which the one or more applets is issued. For example, the first master key 1102 may comprise an Issuer Cryptogram Generation/Authentication Key (Iss-Key-Auth) and the second master key 1126 may comprise an Issuer Data Encryption Key (Iss-Key-DEK). As further explained herein, two issuer master keys 1102, 1126 are diversified into card master keys 1108, 1120, which are unique for each card. In some examples, a network profile record ID (pNPR) 522 and derivation key index (pDKI) 1124, as back office data, may be used to identify which Issuer Master Keys 1102, 1126 to use in the cryptographic processes for authentication. The system performing the authentication may be configured to retrieve values of pNPR 1122 and pDKI 1124 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1108 and Card-Key-Dek 1120). The session keys (Aut-Session-Key 1132 and DEK-Session-Key 1110) may be generated by the one or more applets and derived by using the application transaction counter (pATC) 1104 with one or more algorithms. To fit data into the one or more algorithms, only the 2 low order bytes of the 4-byte pATC 1104 is used. In some examples, the four byte session key derivation method may comprise: F1:=PATC(lower 2 bytes)||'F0'||'00'||PATC (four bytes) F1:=PATC(lower 2 bytes)||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 1104 counter. At each tap of the contactless card, pATC 1104 is configured to be updated, and the card master keys Card-Key-AUTH 508 and Card-Key-DEK 1120 are further diversified into the session keys Aut-Session-Key 1132 and DEK-Session-KEY 1110. pATC 1104 may be initialized to zero at personalization or applet initialization time. In some examples, the pATC counter 1104 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, ... repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 1132. The data specified in cryptogram may be processed with javacard.signature method: ALG_DES_MAC8_IS09797_1_M2_ALG3 to correlate to EMV ARQC verification methods. The key used for this computation may comprise a session key AUT-Session-Key 1132, as explained above. As explained above, the low order two bytes of the counter may be used to diversify for the one or more MAC session keys. As explained below, AUT-Session-Key 1132 may be used to MAC data 1106, and the resulting data or cryptogram An 1114 and random number RND may be encrypted using DEK-Session-Key 1110 to create cryptogram B or output 1118 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1110 derived from the Card-Key-DEK 1120. In this case, the ATC value for the session key derivation is the least significant byte of the counter pATC 1104.

The format below represents a binary version example embodiment. Further, in some examples, the first byte may be set to ASCII 'A'.

| Message Format | | | | |
|---|---|---|---|---|
| 1 | 2 | 4 | 8 | 8 |
| 0x43 (Message Type 'A') | Version | pATC | RND | Cryptogram A (MAC) |

-continued

| Message Format | | | | |
| --- | --- | --- | --- | --- |
| Cryptogram A (MAC) MAC of | 8 bytes | | | |
| 2 Version | 8 pUID | 4 pATC | 4 Shared Secret | 18 bytes input data |

| Message Format | | | |
| --- | --- | --- | --- |
| 1 0x43 (Message Type 'A') | 2 Version | 4 pATC | 16 Cryptogram B |
| Cryptogram A (MAC) MAC of | 8 bytes | | |
| 2 Version | 8 pUID | 4 pATC | 4 Shared Secret   18 bytes input data |
| Cryptogram B Sym Encryption of | 16 | | |
| 8 RND | 8 Cryptogram A | | |

Another exemplary format is shown below. In this example, the tag may be encoded in hexadecimal format.

Method 2 padding via one or more session keys, such as Aut-Session-Key 1132. The input data 1106 may take the

| Message Format | | | | |
| --- | --- | --- | --- | --- |
| 2 Version 8 bytes | 8 pUID | 4 pATC | 8 RND | 8 Cryptogram A (MAC) |
| 8 pUID | 8 pUID | 4 pATC | 4 Shared Secret | 18 bytes input data |

| Message Format | | | |
| --- | --- | --- | --- |
| 2 Version 8 bytes | 8 pUID | 4 pATC | 16 Cryptogram B |
| 8 pUID | pUID | 4 pATC | 4 Shared Secret   18 bytes input data |
| Cryptogram B Sym Encryption of | 16 | | |
| 8 RND | 8 Cryptogram A | | |

The UID field of the received message may be extracted to derive, from master keys Iss-Key-AUTH 502 and Iss-Key-DEK 1126, the card master keys (Card-Key-Auth 1108 and Card-Key-DEK 1120) for that particular card. Using the card master keys (Card-Key-Auth 508 and Card-Key-DEK 1120), the counter (pATC) field of the received message may be used to derive the session keys (Aut-Session-Key 1132 and DEK-Session-Key 1110) for that particular card. Cryptogram B 1118 may be decrypted using the DEK-Session-KEY, which yields cryptogram An 1114 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram An 1114, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1112, data 1106 is processed through the MAC using Aut-Session-Key 1132 to produce MAC output (cryptogram A) 1114, which is encrypted.

In order to provide additional protection against brute force attacks exposing the keys on the card, it is desirable that the MAC cryptogram 1114 be enciphered. In some examples, data or cryptogram An 1114 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1110. In the encryption operation 1116, data or cryptogram An 1114 and RND are processed using DEK-Session-Key 510 to produce encrypted data, cryptogram B 1118. The data may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 12 illustrates a method 1200 for generating a cryptogram. For example, at block 1202, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1204, Issuer Master Keys may be diversified by combining them with the card's unique ID number (pUID) and the PAN sequence number (PSN) of one or more applets, for example, a payment applet.

At block 1206, Card-Key-Auth and Card-Key-DEK (unique card keys) may be created by diversifying the Issuer Master Keys to generate session keys which may be used to generate a MAC cryptogram.

At block 1208, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 13:
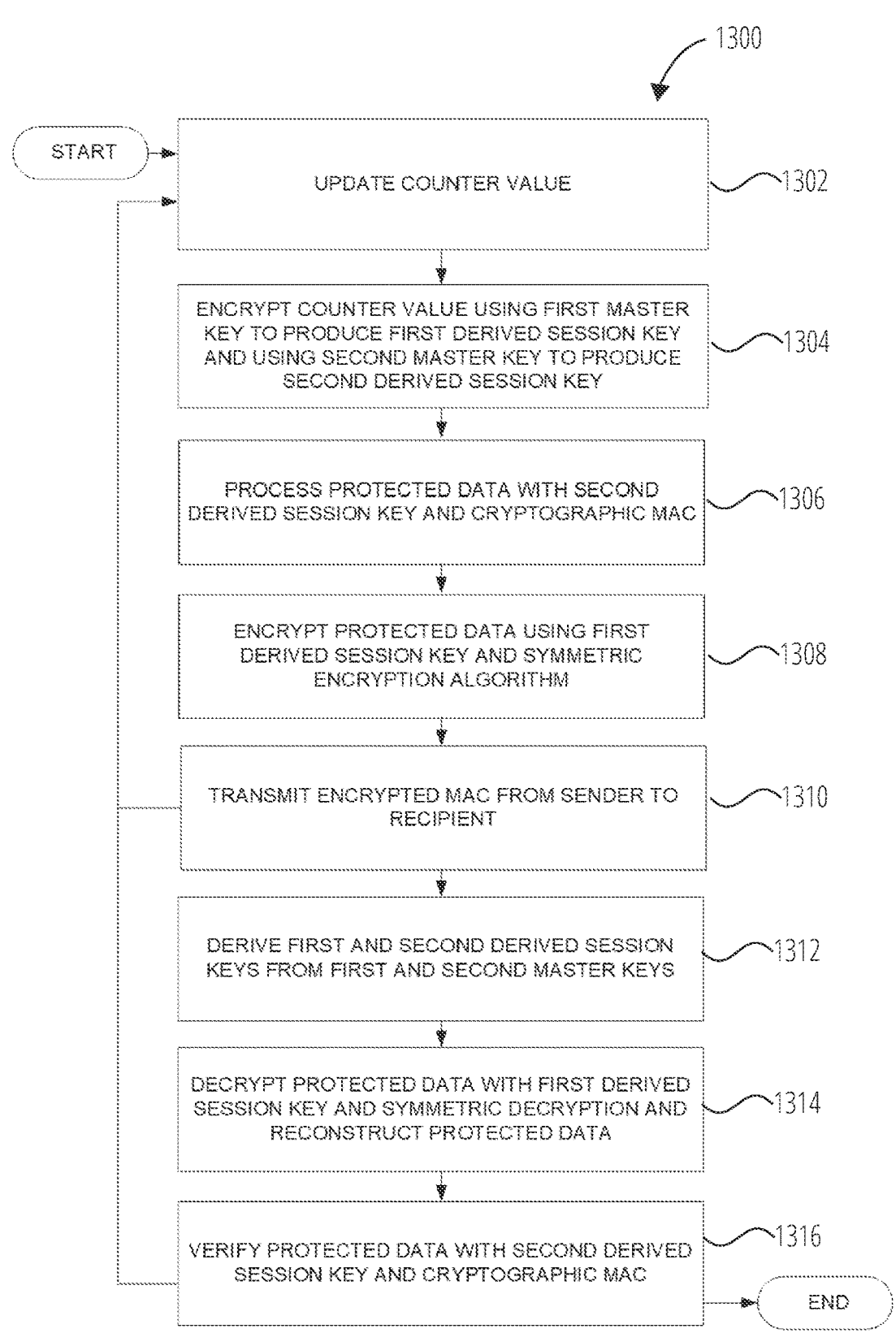
FIG. 13 illustrates an aspect of the subject matter in accordance with one embodiment.

FIG. 13 depicts an exemplary process 1300 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1302, and other data, such as data to be protected, which it may secure share with the recipient.

At block 1304, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1306, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1308, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1310, the encrypted MAC is transmitted, from the sender to the recipient, with sufficient information to identify additional secret information (such as shared secret, master keys, etc.), for verification of the cryptogram.

At block 1312, the recipient uses the received counter value to independently derive the two derived session keys from the two master keys as explained above.

At block 1314, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1316, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1302) and a new set of session keys may be created (at block 1310). In some examples, the combined random data may be discarded.

Figure 14:
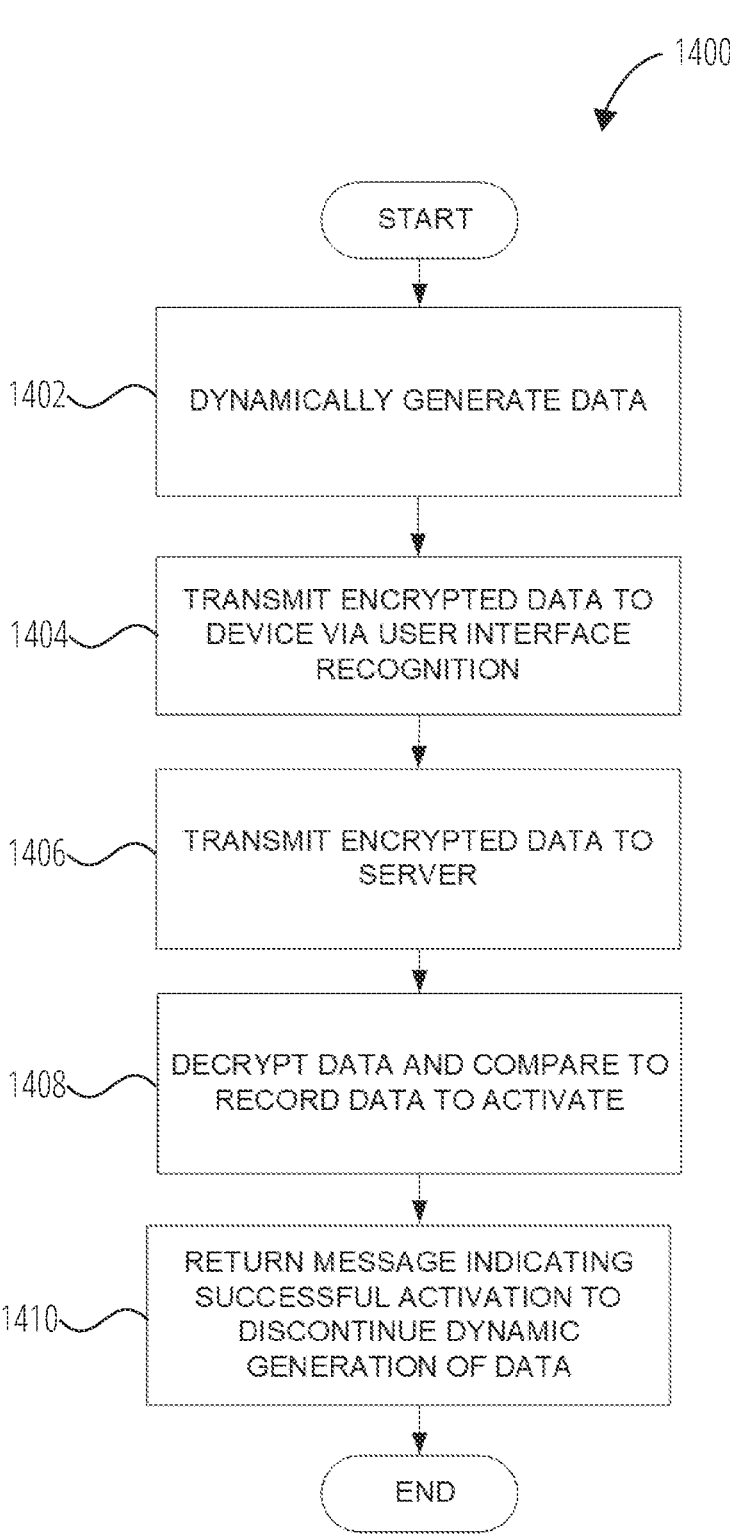
FIG. 14 illustrates an aspect of the subject matter in accordance with one embodiment.

FIG. 14 illustrates a method 800 for card activation according to an example embodiment. For example, card activation may be completed by a system including a card, a device, and one or more servers. The contactless card, device, and one or more servers may reference same or similar components that were previously explained a, such as contactless card 116, mobile device 102, and a server.

In block, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1404, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1406, the one or more portions of the data may be communicated to one or more servers, such as a card issuer server. For example, one or more encrypted portions of the data may be transmitted from the device to the card issuer server for activation of the card.

In block 1408, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1410, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

Figure 15:
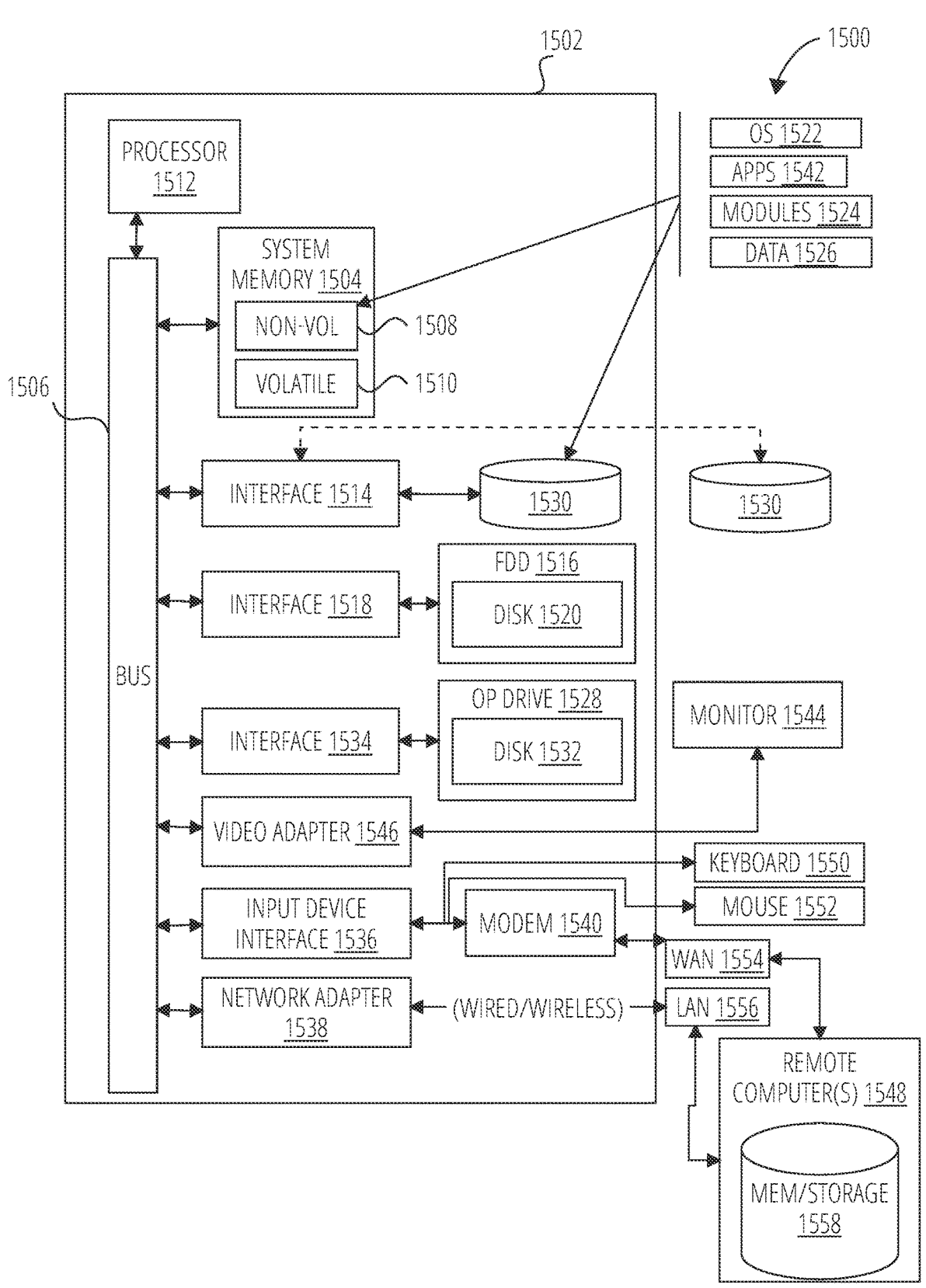
FIG. 15 illustrates a computer architecture 1500 in accordance with one embodiment.

FIG. 15 illustrates an embodiment of an exemplary computer architecture 1500 suitable for implementing various embodiments as previously described. In one embodiment, the computer architecture 1500 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 15, the computing architecture 100 includes a processor 1512, a system memory 1504 and a system bus 1506. The processor 1512 can be any of various commercially available processors.

The system bus 1506 provides an interface for system components including, but not limited to, the system memory 1504 to the processor 1512. The system bus 1506 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1504 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1504 can include non-volatile 1508 and/or volatile 1510. A basic input/output system (BIOS) can be stored in the non-volatile 1508.

The computer 1502 may include various types of computer-readable storage media in the form of one or more lower speed memory units, including an internal (or external) hard disk drive 1530, a magnetic disk drive 1516 to read from or write to a removable magnetic disk 1520, and an optical disk drive 1528 to read from or write to a removable optical disk 1532 (e.g., a CD-ROM or DVD). The hard disk drive 1530, magnetic disk drive 1516 and optical disk drive 1528 can be connected to system bus 1506 the by an HDD interface 1514, and FDD interface 1518 and an optical disk drive interface 1534, respectively. The HDD interface 1514 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1508, and volatile 1510, including an operating system 1522, one or more applications 1542, other program modules 1524, and program data 1526. In one embodiment, the one or more applications 1542, other program modules 1524, and program data 1526 can include, for example, the various applications and/or components of the systems discussed herein.

A user can enter commands and information into the computer 1502 through one or more wire/wireless input devices, for example, a keyboard 1550 and a pointing device, such as a mouse 1552. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1512 through an input device interface 1536 that is coupled to the system bus 1506 but can be connected by other interfaces such as a parallel port, IEEE 1394 serial port, a game port, a USB port, an IR interface, and so forth.

A monitor 1544 or other type of display device is also connected to the system bus 1506 via an interface, such as a video adapter 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all the elements described relative to the computer 1502, although, for purposes of brevity, only a memory and/or storage device 1558 is illustrated. The logical connections depicted include wire/wireless connectivity to a local area network 1556 and/or larger networks, for example, a wide area network 1554. Such LAN and WAN networking environments are commonplace in offices and companies, and facilitate enterprise-wide computer networks, such as intranets, all of which may connect to a global communications network, for example, the Internet.

When used in a local area network 1556 networking environment, the computer 1502 is connected to the local area network 1556 through a wire and/or wireless communication network interface or network adapter 1538. The network adapter 1538 can facilitate wire and/or wireless communications to the local area network 1556, which may also include a wireless access point disposed thereon for communicating with the wireless functionality of the network adapter 1538.

When used in a wide area network 1554 networking environment, the computer 1502 can include a modem 1540, or is connected to a communications server on the wide area network 1554 or has other means for establishing communications over the wide area network 1554, such as by way of the Internet. The modem 1540, which can be internal or external and a wire and/or wireless device, connects to the system bus 1506 via the input device interface 1536. In a networked environment, program modules depicted relative to the computer 1502, or portions thereof, can be stored in the remote memory and/or storage device 1558. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 16:
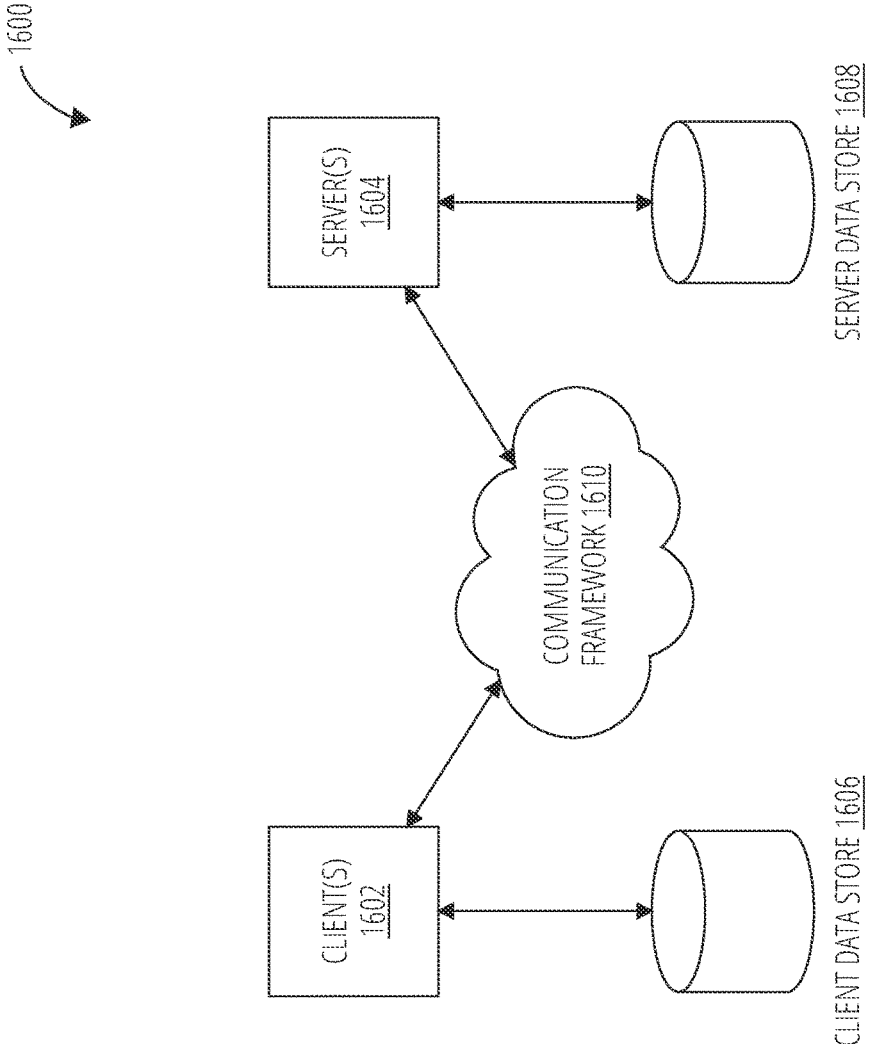
FIG. 16 illustrates a communications architecture 1600 in accordance with one embodiment.

FIG. 16 is a block diagram depicting an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600, which may be consistent with systems and devices discussed herein.

As shown in FIG. 16, the communications architecture 1600 includes one or more client(s) 1602 and server(s) 1604. The server(s) 1604 may implement one or more functions and embodiments discussed herein. The client(s) 1602 and the server(s) 1604 are operatively connected to one or more respective client data store 1606 and server data store 1608 that can be employed to store information local to the respective client(s) 1602 and server(s) 1604, such as cookies and/or associated contextual information.

The client(s) 1602 and the server(s) 1604 may communicate information between each other using a communication framework 1610. The communication framework 1610 may implement any well-known communications techniques and protocols. The communication framework 1610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1602 and the server(s) 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

What is claimed is:

1. A computer-implemented method, comprising:
   establishing, by a call center system, a call connection with a mobile device;

determining, by the call center system, a call session identifier for the call connection and a phone number associated with the mobile device;

sending, by the call center system, a text message to the mobile device based on the phone number, the text message comprising the call session identifier and a mini-application link, the mini-application link configured to retrieve a code snippet from a server by the mobile device;

receiving, by the call center system, authentication information and the call session identifier from the mobile device, the authentication information generated by a contactless card;

determining, by the call center system, the authentication information is authentic;

enabling, by the call center system, the call connection to continue for communications; and receiving, by the call center system, a second text message from the mobile device, the second text message comprising a code to perform authentication of a call agent of the call center system.

2. The computer-implemented method of claim 1, wherein the code snippet is retrieved from the server based on a user interaction with the mini-application link and the mini-application link is a uniform resource locator to the server comprising the code snippet.

3. The computer-implemented method of claim 1, wherein the server is maintained by an application store and the code snippet is downloaded to the mobile device in response to a selection.

4. The computer-implemented method of claim 1, wherein the code snippet is configured to execute on the mobile device and present on a display of the mobile device an indication to tap the contactless card on a surface of the mobile device.

5. The computer-implemented method of claim 1, comprising:

registering, by the call center system, a request to perform an authentication for the call connection; and generating, by the call center system, the call session identifier based on the registering the request.

6. The computer-implemented method of claim 1, comprising:

determining, by the call center system, the phone number for the call connection;

determining, by the call center system, an account is associated with the phone number of the mobile device; and automatically sending, by the call center system, the text message to the mobile device based on the determining the account is associated with the phone number.

7. The computer-implemented method of claim 1, wherein the call center system to receive the authentication information from the code snippet executing on the mobile device, wherein the code snippet is configured to perform a read operation with the contactless card to receive the authentication information and send to the call center system.

8. A call center system, comprising:

processing circuitry; and memory storing instructions that, when executed by the processing circuitry, cause the circuitry to:

determine a call connection with a mobile device;

determine a phone number associated with the mobile device;

send a text message to the mobile device based on the phone number, the text message comprising a mini-application link, the mini-application link configured to retrieve a code snippet on the mobile device;

receive authentication information from the mobile device, the authentication information generated by a contactless card;

authentic the authentication information;

enable, by the call center system, the call connection to continue for communications based on the authentication information being authentic; and receive a second text message from the mobile device, the second text message comprising a code to perform authentication of a call agent of the call center system.

9. The system of claim 8, wherein the call center system to receive the authentication information from the code snippet executing on the mobile device, wherein the code snippet is configured to perform a read operation with the contactless card to receive the authentication information and send to the call center system.

10. The system of claim 8, wherein the code snippet is received from a server based on a user interaction with the mini-application link and the mini-application link is a uniform resource locator to the server comprising the code snippet.

11. The system of claim 10, wherein the server is maintained by an application store and the code snippet is downloadable to the mobile device in response to a selection.

12. The system of claim 8, wherein the code snippet is configured to execute on the mobile device and present on a display of the mobile device an indication to tap the contactless card on a surface of the mobile device.

13. The system of claim 8, comprising further instructions to cause the processing circuitry to:

register a request to perform an authentication for the call connection; and generate a call session identifier based on the registering the request, wherein the call session identifier is communicated to the mobile device and is utilized by the call center system to associate the authentication of the authentication information with the call connection.

14. The system of claim 8, comprising further instructions to cause the processing circuitry to:

determine the phone number for the call connection;

determine an account is associated with the phone number of the mobile device; and automatically send the text message to the mobile device based on the account being associated with the phone number.

15. A computer-implemented method, comprising:

establishing, by a mobile device, a call connection with a call center system;

receiving, by the mobile device, a text message comprising a call session identifier and a mini-application link, the mini-application link configured to retrieve a code snippet from a server;

receiving, by the mobile device, the code snippet from the server;

executing, by the mobile device, the code snippet, the code snippet causing a prompt to present on a display of the mobile device to tap a contactless card on or near the mobile device;

receiving, by the mobile device, authentication information from the contactless card based on the tap of the contactless card on or near the mobile device;

sending, by the mobile device, the authentication information and the call session identifier;

maintaining, by the mobile device, the call connection with the call center system based on an indication the authentication information is authenticated; and sending, by the mobile device, a second text message comprising a code to perform authentication of a call agent of the call center system.

16. The computer-implemented method of claim 15, wherein the mini-application link is a uniform resource locator to the server comprising the code snippet.

17. The computer-implemented method of claim 15, wherein the server is maintained by an application store and the code snippet is downloaded to the mobile device in response to a selection.

\* \* \* \* \*